United States Patent
Yamato

(10) Patent No.: US 9,332,247 B2
(45) Date of Patent: May 3, 2016

(54) IMAGE PROCESSING DEVICE, NON-TRANSITORY COMPUTER READABLE RECORDING MEDIUM, AND IMAGE PROCESSING METHOD

(75) Inventor: Hiroshi Yamato, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 516 days.

(21) Appl. No.: 13/994,038

(22) PCT Filed: Nov. 25, 2011

(86) PCT No.: PCT/JP2011/077187
§ 371 (c)(1),
(2), (4) Date: Jun. 13, 2013

(87) PCT Pub. No.: WO2012/086362
PCT Pub. Date: Jun. 28, 2012

(65) Prior Publication Data
US 2013/0300828 A1  Nov. 14, 2013

(30) Foreign Application Priority Data
Dec. 22, 2010 (JP) ................. 2010-285429

(51) Int. Cl.
*H04N 13/00* (2006.01)
*H04N 13/04* (2006.01)
*G03B 35/08* (2006.01)

(52) U.S. Cl.
CPC ........... *H04N 13/04* (2013.01); *G03B 35/08* (2013.01); *H04N 13/0011* (2013.01); *H04N 13/0018* (2013.01); *H04N 13/0022* (2013.01); *H04N 13/0033* (2013.01); *H04N 2213/002* (2013.01)

(58) Field of Classification Search
CPC .............. H04N 13/04; H04N 13/0011; H04N 13/0018; H04N 13/0022; H04N 13/0033; H04N 2213/002; G03B 35/08
See application file for complete search history.

(56) References Cited

U.S. PATENT DOCUMENTS

| 6,201,517 | B1 * | 3/2001 | Sato | G02B 27/2228 345/51 |
| 2010/0189354 | A1 * | 7/2010 | de Campos | G06K 9/00597 382/190 |

FOREIGN PATENT DOCUMENTS

| JP | 62-115989 A | 5/1987 |
| JP | 6-215092 A | 8/1994 |
| JP | 10-239634 A | 9/1998 |
| JP | 2010-087807 | 4/2010 |

OTHER PUBLICATIONS

International Search Report in International Application No. PCT/JP2011/077187 mailed Feb. 14, 2012, 1 page.

* cited by examiner

*Primary Examiner* — Tat Chio
(74) *Attorney, Agent, or Firm* — Brinks Gilson & Lione

(57) ABSTRACT

Provided is a technique that can reduce the fatigue of the eyes of an observer who observes a stereoscopic image. To attains this object, an image processing apparatus includes: a first acquisition section that obtains a base image; a second acquisition section that obtains pieces of base distance information an identification section that performs an identification process for, classifying an image space into a gaze area and a non-gaze area; a first generation section that performs a generation process for generating a derived image and pieces of derived distance information, the derived image and the pieces of derived distance information being obtained as a result of a blurring process being performed on an image in an area corresponding to the non-gaze area; and a second generation section that generates a pseudo image of the object based on the derived image and the pieces of derived distance information.

29 Claims, 15 Drawing Sheets

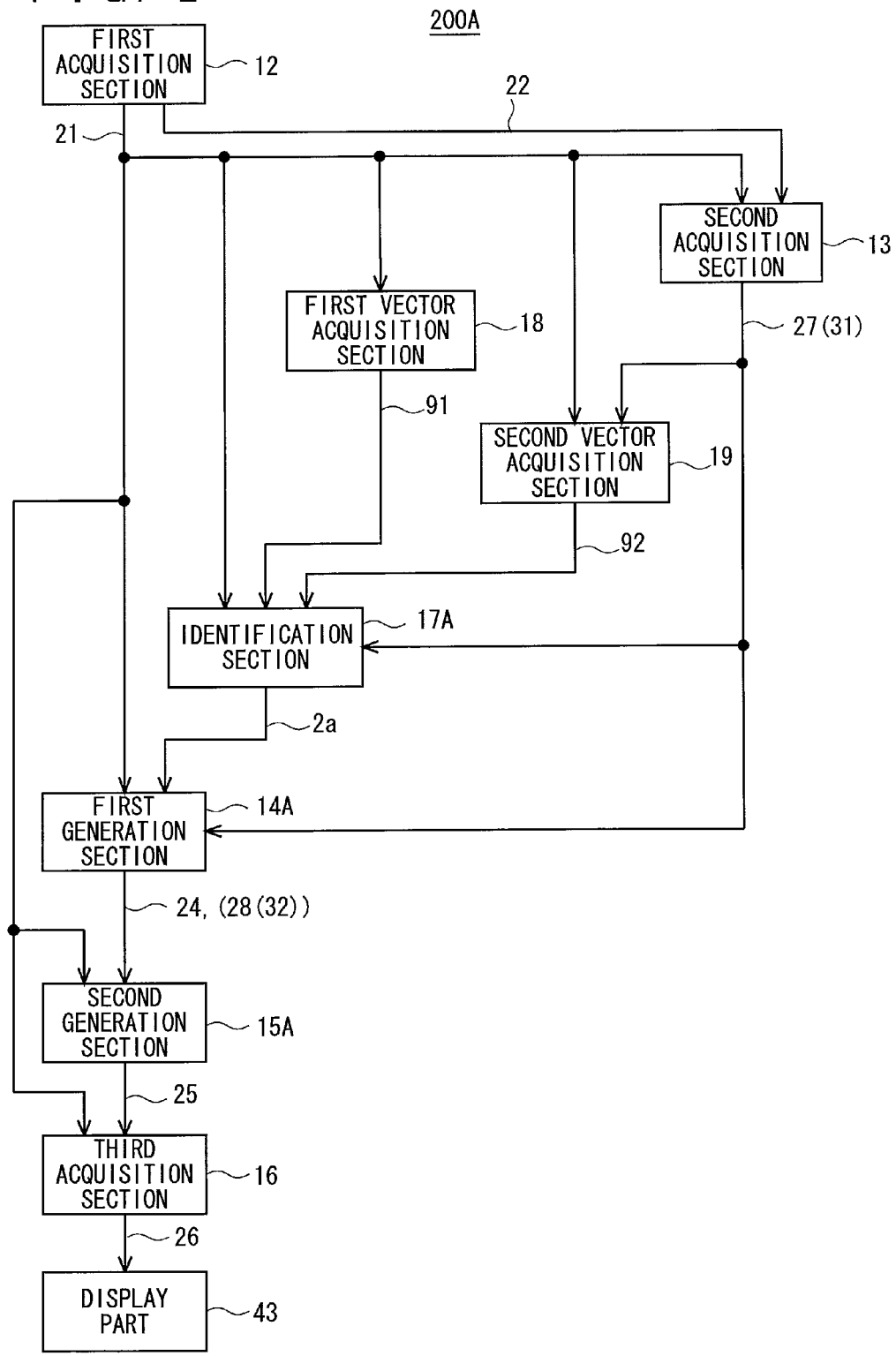

| PIXEL NUMBER OF EACH PIXEL OF PARTIAL IMAGE 23a | 7a | 7b | 7c | 7d | 7e | 7f | 7g | 7h | 7i | 7j |
|---|---|---|---|---|---|---|---|---|---|---|
| X-COORDINATE OF EACH PIXEL OF PARTIAL IMAGE 23a | 101 | 102 | 103 | 104 | 105 | 106 | 107 | 108 | 109 | 110 |
| PARALLAX (DISTANCE INFORMATION) | 40 | 40 | 41 | 41 | 41 | 42 | 42 | 41 | 40 | 40 |
| X-COORDINATE OF EACH PIXEL OF PARTIAL IMAGE 23b | 61 | 62 | 62 | 63 | 64 | 64 | 65 | 67 | 69 | 70 |
| PIXEL NUMBER OF EACH PIXEL OF PARTIAL IMAGE 23b | 8a | 8b | 8b | 8c | 8d | 8d | 8e | 8g | 8i | 8j |

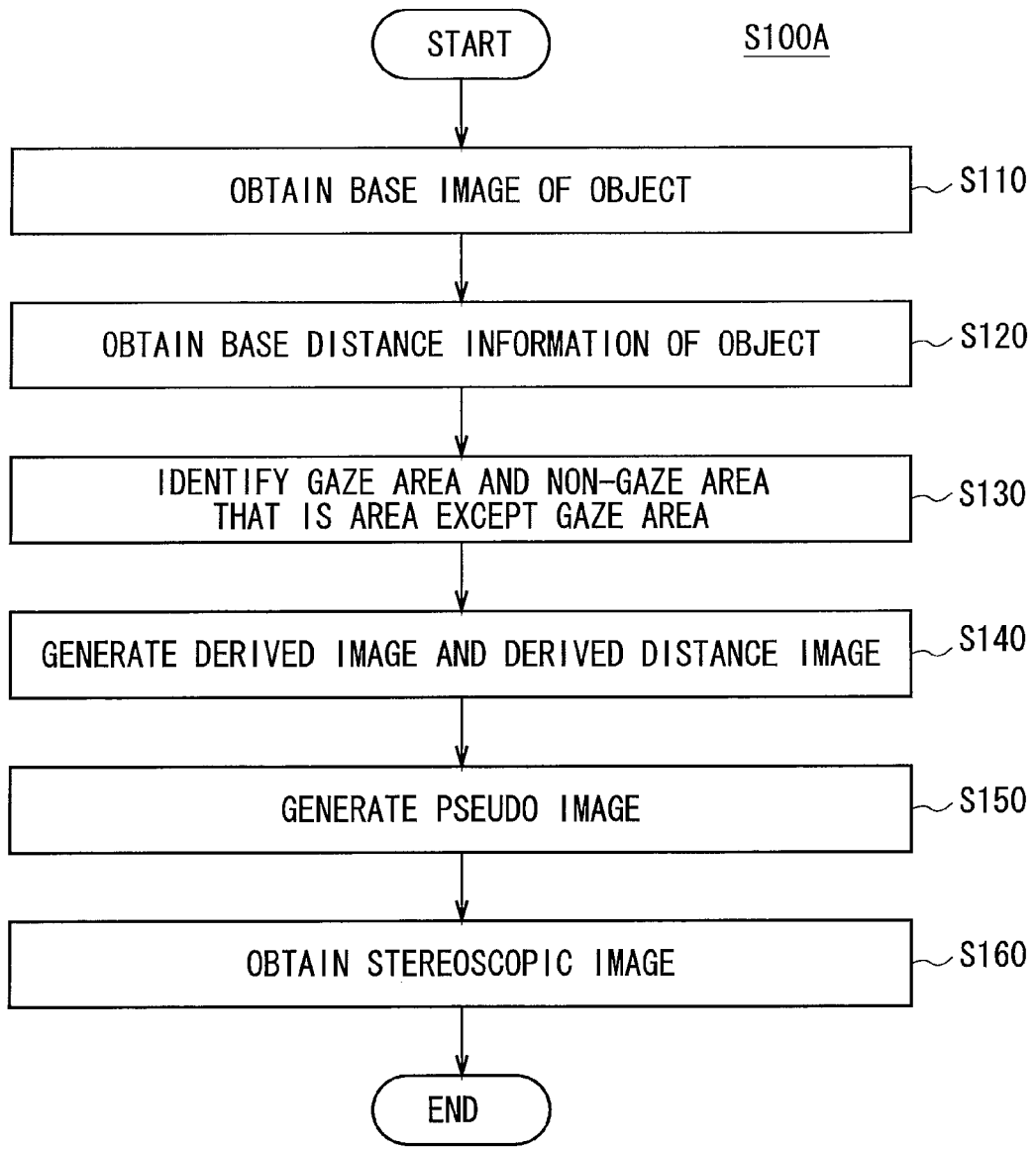

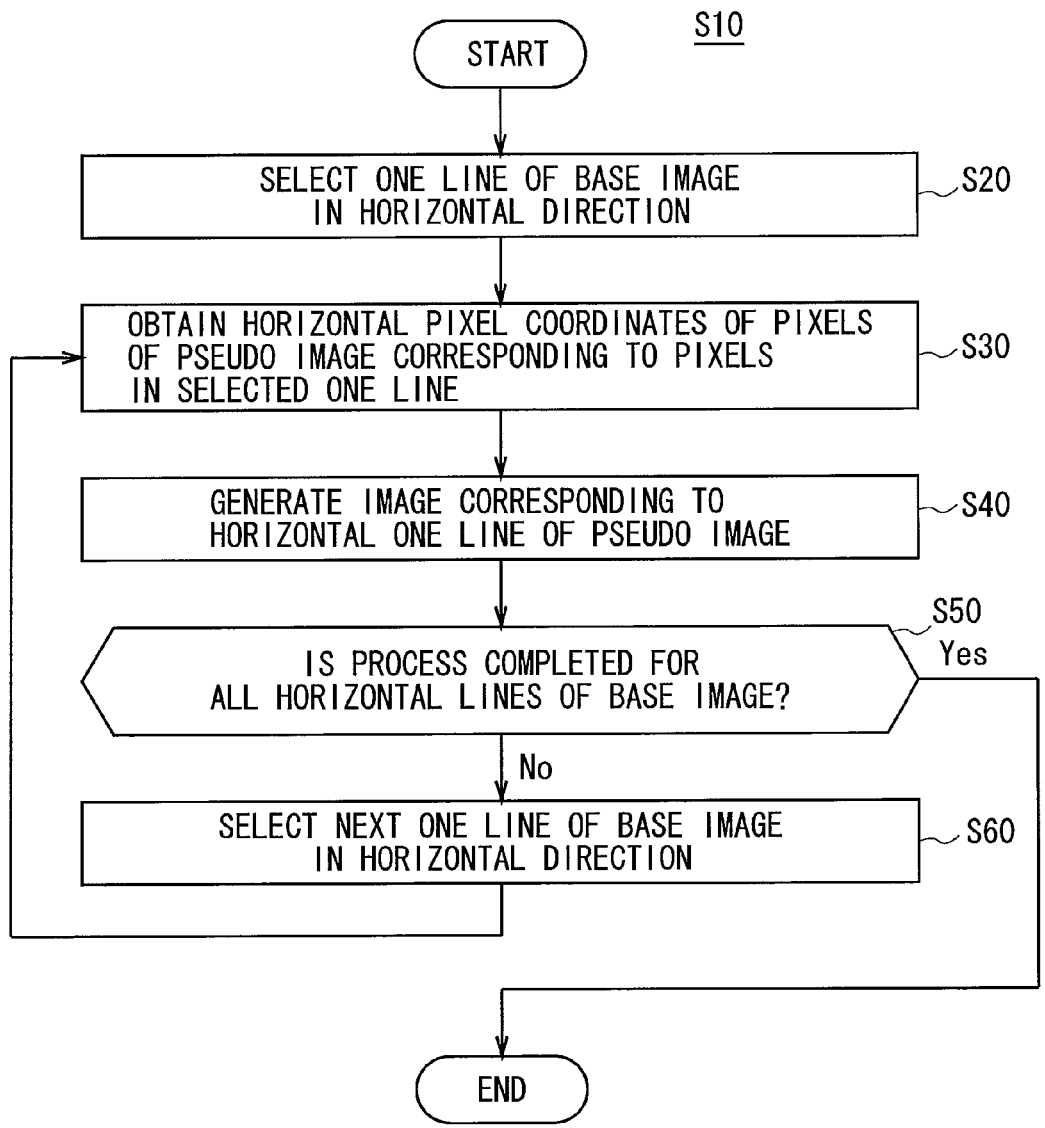
F I G. 2 2

IMAGE PROCESSING DEVICE, NON-TRANSITORY COMPUTER READABLE RECORDING MEDIUM, AND IMAGE PROCESSING METHOD

TECHNICAL FIELD

The present invention relates to an image processing technique.

BACKGROUND ART

In recent years, there is an increasing prevalence of a 3D display device such as a 3D television that allows a stereoscopic view of a displayed image, and a technique is demanded by which image groups (stereoscopic images) corresponding to the left and right eyes can be easily generated. For this purpose, an apparatus that generates by simulation a pseudo image of an image that is obtained when an object is imaged from a predetermined perspective has been started to be used for, for example, generation of a stereoscopic image for various types of displays.

Meanwhile, when an observer observes a stereoscopic image, each part of the entire image is stereoscopically displayed in accordance with a distance of each part of the object corresponding to the part of the entire image. This causes a problem that the eyes of the observer fatigue due to overabundance and mixing of information concerning a stereoscopic view.

Japanese Patent Application Laid-Open No. 2010-087807 proposes a technique of generating a stereoscopic image of an object including a background and a foreground, by generating pseudo images of the object each corresponding to each of the right and left eyes such that the background can be observed further than it actually is. In more detail, in the stereoscopic image generated by the technique disclosed in Japanese Patent Application Laid-Open No. 2010-087807, the positional relationship among parts of a background image corresponding to an original distance is maintained, and in this condition, a display position of the background in the right-eye pseudo image is shifted to the right from its original display position and thus located almost at the center of the image while a display position of the background in the left-eye pseudo image is shifted to the left from its original display position and thus located almost at the center of the image. In Japanese Patent Application Laid-Open No. 2010-087807, the background is shifted, and thereby the display positions of the background in the left-eye pseudo image and the right-eye pseudo image are made almost identical, thus reducing the fatigue of the eyes of the observer.

SUMMARY OF THE INVENTION

Problems to be Solved by the Invention

However, in the technique disclosed in Patent Document 1, the background is shifted to the right and left while distance information of relative distances among parts of the background is maintained. Therefore, flickering caused by overabundance and mixing of information concerning the stereoscopic view in each part of the background is not reduced. As a result, a problem arises that the fatigue of the eyes of the observer is not reduced.

The present invention has been made to solve these problems, and an object of the present invention is to provide a technique that can reduce the fatigue of the eyes of an observer who observes a stereoscopic image.

Means for Solving the Problems

To solve the above-described problems, an image processing apparatus according to a first aspect includes: a first acquisition section that obtains a base image in which an object is captured; a second acquisition section that obtains pieces of base distance information each expressing distance information of a distance from a predetermined origin position to each of points on the object that correspond to respective pixels of the base image; an identification section that performs an identification process for, based on a predetermined criterion, classifying an image space corresponding to each of the base image and a criterion distance image into a gaze area that is an area determined to include a main object of the object and a non-gaze area that is an area except the gaze area, and thus identifying the areas, the criterion distance image being defined by an arrangement of the pieces of base distance information corresponding to a pixel arrangement of the base image; a first generation section that performs a generation process for generating a derived image and pieces of derived distance information that correspond to the base image and the pieces of base distance information, respectively, the derived image and the pieces of derived distance information being obtained as a result of a blurring process being performed on an image in an area of at least one of the base image and the criterion distance image, the area corresponding to the non-gaze area; and a second generation section that generates a pseudo image of the object based on the derived image and the pieces of derived distance information, the pseudo image corresponding to image-capturing from a virtual perspective that is different from a perspective from which the base image has been captured.

An image processing apparatus according to a second aspect is the image processing apparatus according to the first aspect, in which the identification section performs the identification process based on at least one of a state of a statistical distribution and a state of a spatial distribution of coloration in the base image.

An image processing apparatus according to a third aspect is the image processing apparatus according to the first aspect, in which the identification section performs the identification process by identifying, as the non-gaze area, a portion to be blurred in the base image.

An image processing apparatus according to a fourth aspect is the image processing apparatus according to the first aspect, in which the identification section performs the identification process based on area information that specifies a range of a central portion of the base image.

An image processing apparatus according to a fifth aspect is the image processing apparatus according to the first aspect, in which: the first acquisition section obtains another image of the object captured at a time different from a time when the base image has been captured; the image processing apparatus further comprises a two-dimensional movement vector acquisition section that obtains a two-dimensional movement vector with respect to each pixel of the base image based on the base image and said another image; and the identification section performs the identification process based on the two-dimensional movement vectors.

An image processing apparatus according to a sixth aspect is the image processing apparatus according to the fourth aspect, in which the identification section performs the identification process based on a vanishing point of the two-dimensional movement vector.

An image processing apparatus according to a seventh aspect is the image processing apparatus according to the first aspect, in which the identification section performs the identification process based on the pieces of base distance information.

An image processing apparatus according to an eighth aspect is the image processing apparatus according to the seventh aspect, in which the identification section performs the identification process based on, among the pieces of base distance information, pieces of distance information within a predetermined distance range.

An image processing apparatus according to a ninth aspect is the image processing apparatus according to the seventh aspect, in which the identification section performs the identification process based on, among the pieces of base distance information, pieces of distance information that are identified based on focusing distance information concerning the base image.

An image processing apparatus according to a tenth aspect is the image processing apparatus according to the seventh aspect, in which the identification section performs the identification process by identifying an area of the criterion distance image as the gaze area, the area having a size equal to or larger than a predetermined size and being formed by connection of such pixels that a difference in the pieces of distance information is within a predetermined distance range.

An image processing apparatus according to an eleventh aspect is the image processing apparatus according to the seventh aspect, in which the identification section performs the identification process by identifying an area of the criterion distance image as the gaze area, the area having the largest size among areas each of which has a size equal to or larger than a predetermined size and is formed by connection of such pixels that a difference in the pieces of distance information is within a predetermined distance range.

An image processing apparatus according to a twelfth aspect is the image processing apparatus according to the seventh aspect, in which the identification section performs the identification process based on area information that specifies a range of a predetermined spatial area of the criterion distance image.

An image processing apparatus according to a thirteenth aspect is the image processing apparatus according to the first aspect, in which: the first acquisition section obtains another image of the object captured at a time different from a time when the base image has been captured; the second acquisition section obtains other pieces of distance information with respect to points on the object each corresponding to each of pixels of said another image; the image processing apparatus further comprises a three-dimensional movement vector acquisition section that obtains a three-dimensional movement vector with respect to each pixel of the base image based on the base image, said another image, the pieces of base distance information, and said other pieces of distance information; and the identification section performs the identification process based on the three-dimensional movement vectors.

An image processing apparatus according to a fourteenth aspect is the image processing apparatus according to the thirteenth aspect, in which the identification section performs the identification process by extracting an area of the base image in which a moving object is captured based on the three-dimensional movement vectors, and identifying the area as the gaze area.

An image processing apparatus according to a fifteenth aspect is the image processing apparatus according to the thirteenth aspect, in which the identification section performs the identification process by identifying, as the gaze area, an area of the base image in which the three-dimensional movement vector has a value equal to or greater than a predetermined threshold value.

An image processing apparatus according to a sixteenth aspect is the image processing apparatus according to the thirteenth aspect, in which the identification section performs the identification process by identifying, among the three-dimensional movement vectors, the three-dimensional movement vector having an extension line thereof intersecting with an image-capturing system for capturing the base image, and identifying, as the gaze area, an area of the base image corresponding to the identified three-dimensional movement vector.

An image processing apparatus according to a seventeenth aspect is the image processing apparatus according to the first aspects, in which the first generation section generates the pieces of derived distance information by performing a blurring process on an image in an area of the criterion distance image corresponding to the non-gaze area.

An image processing apparatus according to an eighteenth aspect is the image processing apparatus according to the seventeenth aspect, in which the first generation section performs the blurring process by performing an averaging filter process on an image in an area of the criterion distance image corresponding to the non-gaze area.

An image processing apparatus according to a nineteenth aspect is the image processing apparatus according to the seventeenth aspect, in which the first generation section performs the blurring process by, with respect to each pixel in an area of the criterion distance image corresponding to the non-gaze area, identifying, as a pixel value of the pixel, the mode of the pieces of distance information in an area containing the pixel and having a predetermined size.

An image processing apparatus according to a twentieth aspect is the image processing apparatus according to the seventeenth aspect, in which the first generation section performs the blurring process by changing each piece of distance information in an area of the criterion distance image corresponding to the non-gaze area to a farther side of the origin position.

An image processing apparatus according to a twenty-first aspect is the image processing apparatus according to the first aspect, in which the first generation section generates the derived image by performing a blurring process on an image in an area of the base image corresponding to the non-gaze area.

An image processing apparatus according to a twenty-second aspect is the image processing apparatus according to the fifth aspect, in which the first generation section being configured to: a) perform the generation process by performing a blurring process on an image in an area of the base image corresponding to the non-gaze area; and b) generate another derived image corresponding to said another image, by performing a blurring process on pixels of said another image each of which is associated with each of pixels in the area by each of the two-dimensional movement vectors, the blurring process being the same as the blurring process applied to the pixels of the base image with which the pixels are associated.

An image processing apparatus according to a twenty-third aspect is the image processing apparatus according to the twenty-first aspect, in which the first generation section performs the blurring process by performing an averaging filter process on an image in an area of the base image corresponding to the non-gaze area.

An image processing apparatus according to a twenty-fourth aspect is the image processing apparatus according to the twenty-first aspect, in which the first generation section performs the blurring process by obtaining, based on pixel values of pixels discretely identified in an area of the base image corresponding to the non-gaze area, pixel values of pixels of the area other than the discretely-identified pixels.

An image processing apparatus according to a twenty-fifth aspect is the image processing apparatus according to the twenty-first aspect, in which the first generation section performs the blurring process by removing a spatial high-frequency component of a pixel value in an area of the base image corresponding to the non-gaze area.

An image processing apparatus according to a twenty-sixth aspect is the image processing apparatus according to the first aspect, in which the first generation section performs blurring processes with different degrees of blurring on a farther area and a closer area, respectively, of an image in an area of at least one of the base image and the criterion distance image corresponding to the non-gaze area, the farther area being at the farther side of the origin position than the gaze area is, the closer area being at the closer side of the origin position than the gaze area is.

An image processing apparatus according to a twenty-seventh aspect is the image processing apparatus according to the first aspect, further including a third acquisition section that obtains a stereoscopic image based on the pseudo image.

A non-transitory computer readable recording medium storing a computer-readable program according to a twenty-eighth aspect, the program controlling a computer to operate as an image processing apparatus, and the image processing apparatus includes: a first acquisition section that obtains a base image in which an object is captured; a second acquisition section that obtains pieces of base distance information each expressing distance information of a distance from a predetermined origin position to each of points on the object that correspond to respective pixels of the base image; an identification section that performs an identification process for, based on a predetermined criterion, classifying an image space corresponding to each of the base image and a base distance image into a gaze area that is an area determined to include a main object of the object and a non-gaze area that is an area except the gaze area, and thus identifying the areas, the base distance image being defined by an arrangement of the pieces of base distance information corresponding to a pixel arrangement of the base image; a first generation section that performs a generation process for generating a derived image and pieces of derived distance information that correspond to the base image and the pieces of base distance information respectively, the derived image and the pieces of derived distance information being obtained as a result of a blurring process being performed on an image in an area of at least one of the base image and the base distance image, the area corresponding to the non-gaze area; and a second generation section that generates a pseudo image of the object based on the derived image and the pieces of derived distance information, the pseudo image corresponding to image-capturing from a virtual viewpoint that is different from a viewpoint from which the base image has been captured.

An image processing method according to a twenty-ninth aspect includes: a first acquisition step of obtaining a base image in which an object is captured; a second acquisition step of obtaining pieces of base distance information each expressing distance information of a distance from a predetermined origin position to each of points on the object that correspond to respective pixels of the base image; an identification step of performing an identification process for, based on a predetermined criterion, classifying an image space corresponding to each of the base image and a criterion distance image into a gaze area that is an area determined to include a main object of the object and a non-gaze area that is an area except the gaze area, and thus identifying the areas, the criterion distance image being defined by an arrangement of the pieces of base distance information corresponding to a pixel arrangement of the base image; a first generation step of performing a generation process for generating a derived image and pieces of derived distance information that correspond to the base image and the pieces of base distance information, respectively, the derived image and the pieces of derived distance information being obtained as a result of a blurring process being performed on an image in an area of at least one of the base image and the criterion distance image, the area corresponding to the non-gaze area; and a second generation step of generating a pseudo image of the object based on the derived image and the pieces of derived distance information, the pseudo image corresponding to image-capturing from a virtual perspective that is different from a perspective from which the base image has been captured.

Effects of the Invention

In the image processing apparatus according to any of the first to twenty-seventh aspects, or in the non-transitory computer readable medium according to the twenty-eighth aspect, or in the image processing method according to the twenty-ninth aspect, the fatigue of the eyes of an observer who observes a stereoscopic image can be reduced.

BRIEF DESCRIPTION OF THE DRAWINGS

FIG. 2 is a diagram showing one example of a principal function configuration of an image processing apparatus according to the embodiment.

FIG. 21 is a diagram illustrating an operational flow in the image processing apparatus according to the embodiment.

FIG. 22 is a diagram illustrating an operational flow of the basic method for generating the pseudo image.

EMBODIMENT FOR CARRYING OUT THE INVENTION

<Regarding Embodiment:>
<Regarding Image Processing System 100A:>

Figure 1:
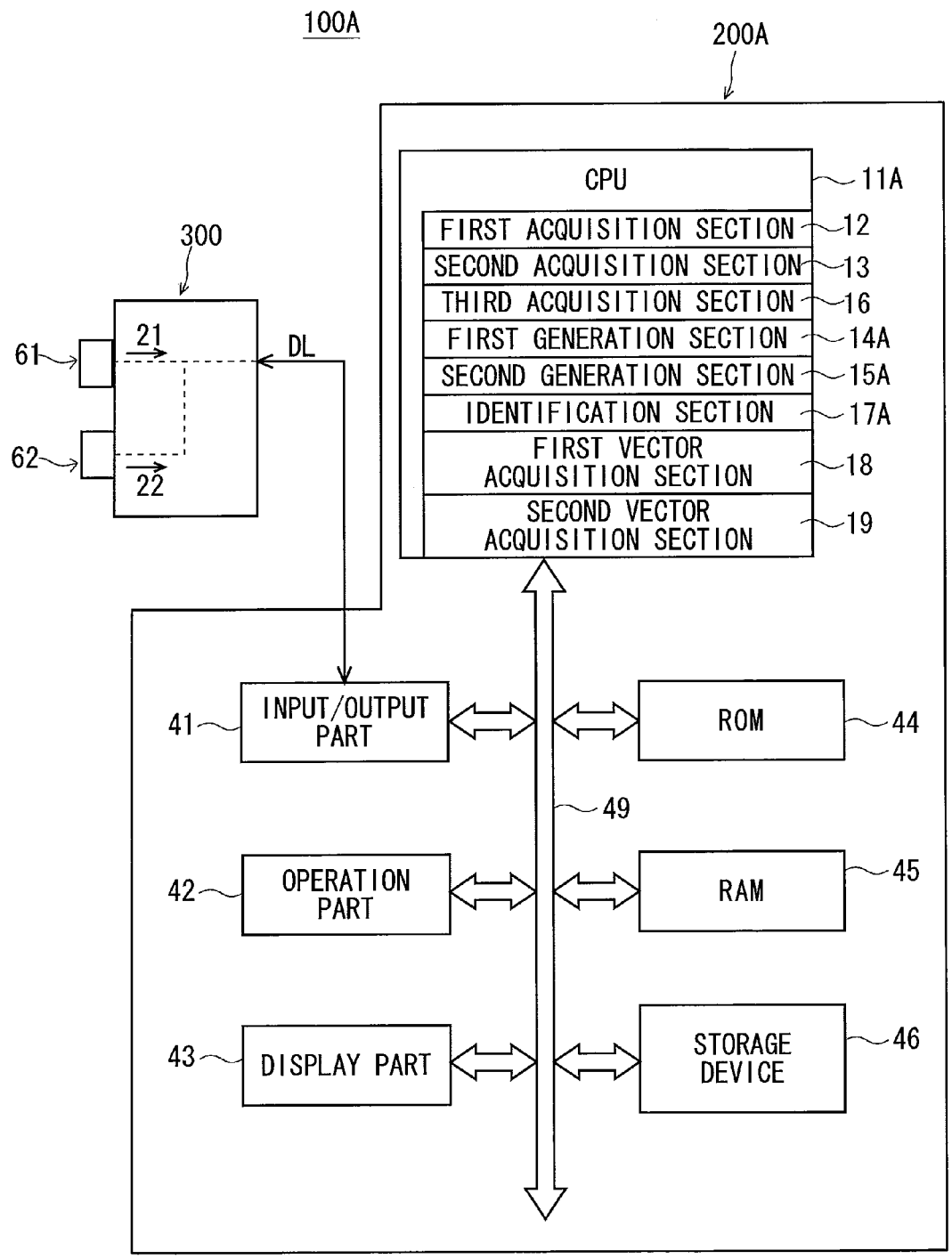
FIG. 1 is a diagram showing one example of a principal configuration of an image processing system according to an embodiment.

FIG. 1 is a block diagram showing one example of a principal configuration of an image processing system 100A according to an embodiment. As shown in FIG. 1, the image processing system 100A mainly includes a stereo camera 300 and an image processing apparatus 200A. In the image processing system 100A, the image processing apparatus 200A acquires a base image 21 (FIG. 1, FIG. 2) and a reference image 22 (FIG. 1, FIG. 2) that are obtained as a result of capturing images by the stereo camera 300, and the image processing apparatus 200A processes the base image 21 and the reference image 22 to thereby generate a pseudo image 25 (FIG. 2) that corresponds to image-capturing of an object from a virtual perspective different from the perspective from which the base image 21 has been captured. In other words, the pseudo image 25 is equivalent to an image of the object obtained when the object is imaged from a virtual perspective different from the perspective from which the base image 21 has been captured.

<Configuration and Operation of Stereo Camera 300:>

Figure 3:
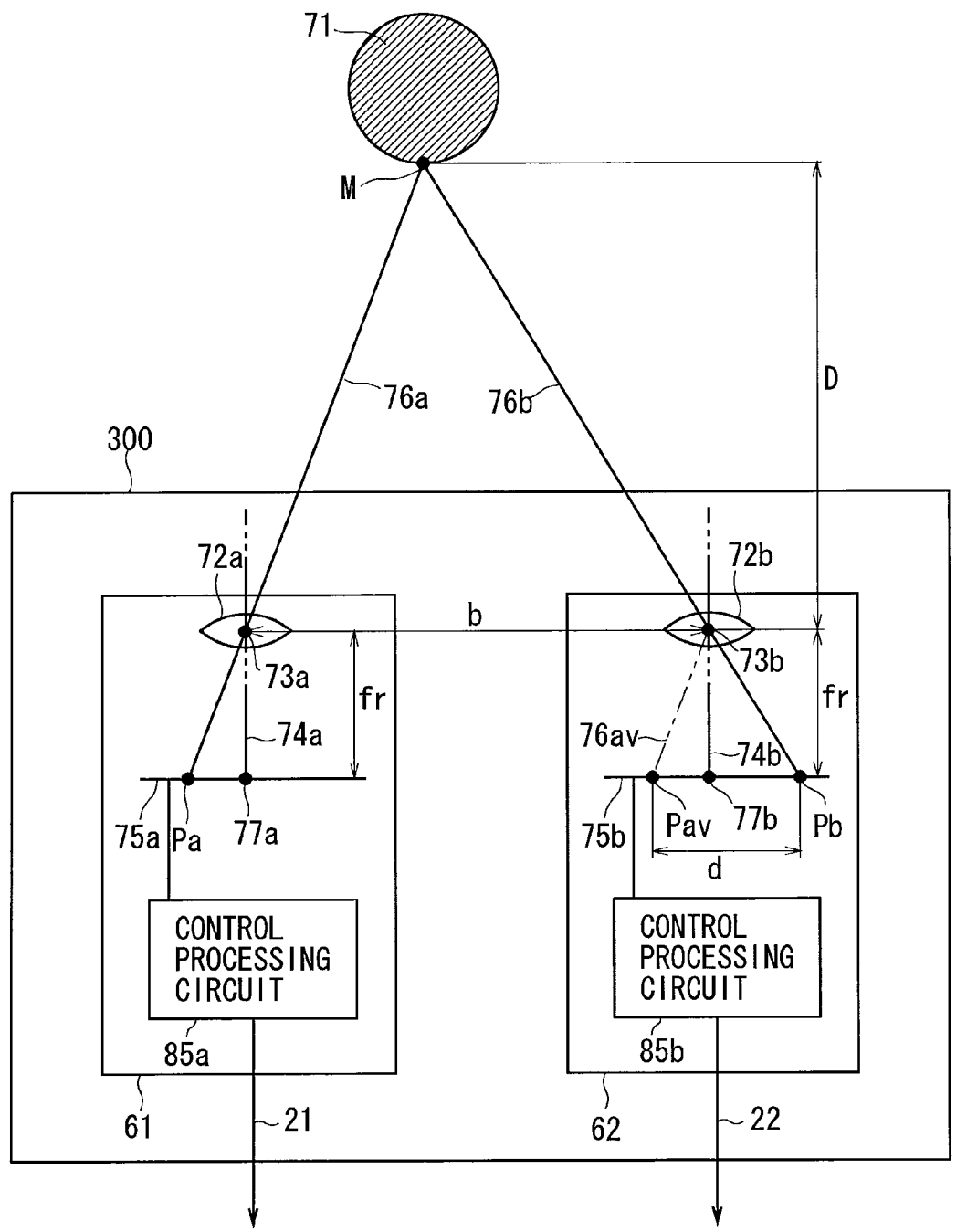
FIG. 3 is a diagram showing one example of a principal function configuration of a stereo camera according to the embodiment.

Next, a configuration and an operation of the stereo camera 300 will be described. FIG. 3 is a diagram showing one example of a principal function configuration of the stereo camera 300 according to the embodiment. As shown in FIG. 3, the stereo camera 300 mainly includes a base camera 61 and a reference camera 62. The base camera 61 and the reference camera 62 are arranged apart from each other by a predetermined base line length with respect to the vertical direction. The base camera 61 mainly includes an image-capturing optical system 72a, an image capturing device 75a, and a control processing circuit 85a. The reference camera 62 mainly includes an image-capturing optical system 72b, an image capturing device 75b, and a control processing circuit 85b.

Various operations of the stereo camera 300 are controlled based on a control signal that is supplied from the image processing apparatus 200A via an input/output part 41 and a data line DL. The stereo camera 300 captures an image of light from an object 71 by means of the base camera 61 and the reference camera 62 to thereby acquire the base image 21 and the reference image 22 from which a stereo image is configured, and supplies the base image 21 and the reference image 22 to the image processing apparatus 200A.

The image-capturing optical systems 72a and 72b, each of which mainly includes a thin lens and a lens barrel (not shown) that supports the lens, are optical systems that form images of the object 71 on the image capturing devices 75a and 75b, respectively. At this time, an image of an object point M on the object 71 is imaged as imaging points Pa and Pb on the image capturing devices 75a and 75b, respectively, along principal rays 76a and 76b passing through optical centers 73a and 73b, respectively. The optical centers 73a and 73b are normally principal points of image-capturing optical systems. However, for example, in a case where a telecentric optical system is adopted as the image-capturing optical system, a focal point of the image-capturing optical system normally serves as the optical center.

A virtual principal ray 76av is a virtual principal ray obtained as a result of parallel-shifting the principal ray 76a such that the principal ray 76a passes through the optical center 73b. A virtual imaging point Pav corresponding to the imaging point Pa is set on the image capturing device 75b along the virtual principal ray 76av.

The centers 77a and 77b of image formation of the base camera 61 and the reference camera 62 are intersections between the image capturing device 75a and an optical axis 74a and between the image capturing device 75b and an optical axis 74b, respectively. A base line length b between the image-capturing optical systems 72a and 72b is a distance between the optical centers 73a and 73b.

A distance d between the virtual imaging point Pav and the imaging point Pb is a distance between positions of imaging points obtained when the imaging points Pa and Pb corresponding to the same object point M on the object 71 are expressed in a common image coordinate system in which the centers of image formation thereof are identical to each other. The distance d is equivalent to a parallax between the base camera 61 and the reference camera 62 with respect to the object point M. The parallax will be described later.

In the stereo camera 300, focal point distances fr of the image-capturing optical systems 72a and 72b (and more exactly, distances between the optical centers and the image capturing devices thereof) are equal to each other, and their optical axes 74a and 74b are in parallel with each other. Principal planes of the image-capturing optical systems 72a and 72b are in the same plane perpendicular to each of the optical axes 74a and 74b. The optical centers 73a and 73b thereof are also in the same plane. The image capturing devices 75a and 75b of the image-capturing optical systems 72a and 72b are in the same plane perpendicular to each of the optical axes 74a and 74b. To make it easy to perform a corresponding point retrieval process for retrieving corresponding points between the base image 21 and the reference image 22, the image capturing devices 75a and 75b are arranged such that their scanning lines are in parallel with each other.

In an actual configuration, there is normally an error relative to the above-described configuration conditions. The image processing apparatus 200A performs a process (also referred to as "parallelization process"), by using a camera parameter and the like, on the base image 21 and the reference image 22 supplied from the base cameras 61 and 62. Thereby, a state equivalent to a state obtained when function elements of the stereo camera 300 satisfy the above-described configuration conditions is achieved.

Each of the image capturing devices 75a and 75b is an image capturing device including a CCD image sensor, a CMOS image sensor, or the like, having a size of 3456×2592 pixels as the effective number of pixels. The image capturing devices 75a and 75b generate image signals in accordance with the intensities of images formed on the image capturing devices 75a and 75b, and supply the image signals to the control processing circuit 85a and the control processing circuit 85b, respectively. Irrespective of whether the image capturing devices 75a and 75b are color image sensors or monochrome image sensors, the usability of the present invention is not impaired.

The control processing circuit 85a and the control processing circuit 85b shown in FIG. 3 process the image signals supplied from the image capturing devices 75a and 75b in synchronization with each other, to convert the image signals into digital images. Thereby, the control processing circuit 85a and the control processing circuit 85b generate the base image 21 (FIG. 1, FIG. 2) and the reference image 22 (FIG. 1, FIG. 2) in accordance with the effective number of pixels of the respective image capturing devices, and supply the base image 21 (FIG. 1, FIG. 2) and the reference image 22 (FIG. 1, FIG. 2) to the image processing apparatus 200A. The base image 21 and the reference image 22 thus generated configure a stereo image of the object.

It is not always necessary that the base image 21 and the reference image 22 capture images at the same time, as long as the positional relationship of the object relative to the stereo camera 300 is unchanged at times when the base image 21 and reference image 22 capture images. The stereo camera 300 is also able to generate a plurality of base images 21 and a plurality of reference images 22 (also referred to as "chronological stereo image") by continuously capturing images of the object sequentially over time while synchronizing the base camera 61 and the reference camera 62 with each other. Here, it should be noted that, when the stereo camera 300 captures images of the object to obtain a chronological stereo image, the stereo camera 300 can be moved.

The base image 21 and the reference image 22 thus generated are supplied via the data line DL to the input/output part 41 of the image processing apparatus 200A.

Figure 4:
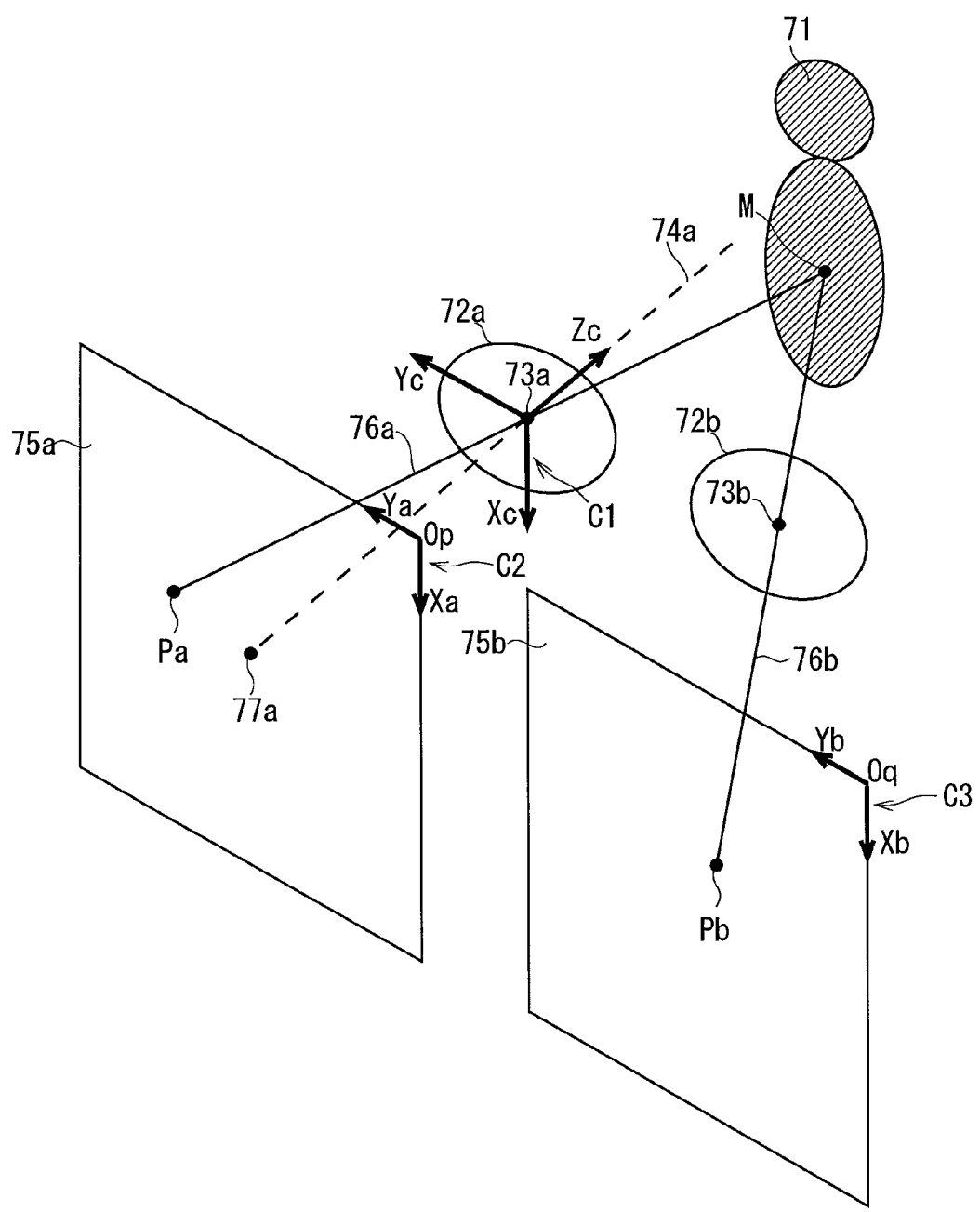
FIG. 4 is a diagram illustrating a camera coordinate system of the stereo camera and image coordinate systems.

Regarding Coordinate System of Stereo Camera 300:

FIG. 4 is a diagram illustrating a camera coordinate system C1 of the stereo camera 300, and image coordinate systems C2 and C3. Among elements shown in FIG. 4, elements identical to those shown in FIG. 3 are given the same reference signs as given on FIG. 3, and a description thereof is omitted.

As shown in FIG. 4, the camera coordinate system C1 is a rectangular coordinate system provided with respect to the image-capturing optical system 72a of the base camera 61. The origin of the camera coordinate system C1 is the optical center 73a, and the coordinate axes are Xc, Yc, and Zc. The direction of the Zc-axis is coincident with the optical axis 74a, and the Xc-axis is in parallel with the scanning line of the image capturing device 75a.

The image coordinate system C2 is a rectangular coordinate system representing the coordinates of each imaging point in the base image 21. The origin of the image coordinate system C2 is a corner Op of the image capturing device 75a that is arranged relative to the image-capturing optical system 72a. Their coordinate axes are Xa and Ya. The direction of the Xa-axis is coincident with a horizontal scanning direction (main scanning direction) of the image capturing device 75a, and the direction of the Ya-axis is coincident with a vertical scanning direction (sub scanning direction) of the image capturing device 75a.

Likewise, the image coordinate system C3 is a rectangular coordinate system representing the coordinates of each imaging point in the reference image 22. The origin of the image coordinate system C3 is a corner Oq of the image capturing device 75b that is arranged relative to the image-capturing optical system 72b. Their coordinate axes are Xb and Yb. The direction of the Xb-axis is coincident with a horizontal scanning direction (main scanning direction) of the image capturing device 75b, and the direction of the Yb-axis is coincident with a vertical scanning direction (sub scanning direction) of the image capturing device 75b.

An image observed by an observer is a vertically and horizontally inverted version of the image formed on the image capturing device. Therefore, in an image coordinate system of the image observed by the observer, like an XY coordinate system that is set to the base image 21 shown in FIG. 5 which will be described later, the origin is the upper left end of the image, and the orientations of an X-axis and a Y-axis of the image coordinate system on the image capturing device are inverted.

<Description of Method for Three-Dimensional Measurement based on Stereo Image:>

Next, a method for three-dimensional measurement based on a stereo image obtained as a result of capturing images by the stereo camera 300 will be described. The method for three-dimensional measurement is adopted by, in a case of the image processing apparatus 200A, a second vector acquisition section 19 which will be described later. In a case where the parallelization process is performed, a distance D between the object point M and the principal plane of the image-capturing optical systems 72a and 72b shown in FIG. 3 is given by the expression (1) using the parallax d, the focal point distance fr, and the base line length b between the image-capturing optical systems 72a and 72b.

[Math. 1]

$$D = \frac{fr \times b}{d} \quad (1)$$

As shown in the expression (1), the parallax serves as an index value of the distance from the stereo camera 300 to a point on the object.

Additionally, the relationship between coordinates Mc of the object point M on the object 71, which are expressed in the camera coordinate system C1 shown in FIG. 4, and coordinates Pac of the imaging point Pa on the image capturing device 75a corresponding to the object point M, which are expressed in the image coordinate system C2, is given by the expression (2).

[Math. 2]

$$P_{ac} = \frac{1}{Z_c}\begin{bmatrix} \frac{fr}{ps} & 0 & u_0 \\ 0 & \frac{fr}{ps} & v_0 \end{bmatrix} M_c \quad (2)$$

The distance D in the expression (1) and the coordinates $z_c$ shown in the expression (2) are the same. Therefore, firstly, the parallax d between the imaging points Pa and Pb corresponding to the object point M, which is obtained by the corresponding point retrieval process which will be described later, is assigned to the expression (1), to obtain the distance D. Then, the distance D thus obtained is assigned to $z_c$ of the expression (2), and thereby $x_c$ and $y_c$ are also obtained.

The image-capturing optical systems 72a and 72b have aberrations. When distortions of the parallax d and the coordinates Pac caused by the aberrations are corrected through an aberration correction process, the coordinates Mc of the object point M can be obtained more exactly. However, even when the aberration correction process is not performed, the usability of the present invention is not impaired. Processing of the aberration correction process is given by the expression (3).

[Math. 3]

$$P'_{ac} = (k_1 r_a^2 + k_2 r_a^4 + k_3 r_a^6)\overline{P_{ac}} + \begin{bmatrix} 2k_4 \overline{u_a v_a} + k_5(r_a^2 + 2\overline{u_a^2}) \\ k_4(r_a^2 + 2\overline{v_a^2}) + 2k_5 \overline{u_a v_a} \end{bmatrix} + \begin{bmatrix} u_0 \\ v_0 \end{bmatrix} \quad (3)$$

where:

$$P'_{ac} = \begin{bmatrix} u'_a \\ v'_a \end{bmatrix}:$$

the coordinates of the imaging point Pa' obtained by correcting aberrations of the imaging point Pa on the image capturing device 75a (image coordinate system C2)

$$P_{ac} = \begin{bmatrix} u_a \\ v_a \end{bmatrix}:$$

the coordinates of the imaging point Pa on the image capturing device 75a (image coordinate system C2)

$$\overline{P_{ac}} = \begin{bmatrix} u_a - u_0 \\ v_a - v_0 \end{bmatrix} = \begin{bmatrix} \overline{u_a} \\ \overline{v_a} \end{bmatrix}, r_a^2 = \|\overline{P_{ac}}\|^2$$

$u_0$, $v_0$: the position of the center of image formation (image coordinate system C2)

Here, in the expressions (1) to (3), the focal point distance fr, the base line length b, a pixel size ps of the image capturing device, the coordinates u0 and v0 of the center of image formation, and aberration correction coefficients k1 to k5 are camera parameters used for 3D rendering. The aberration correction coefficients k1 to k3 are coefficients for correcting aberrations of the lenses of the image-capturing optical system 72a and the image-capturing optical system 72b with respect to a radial direction thereof. The aberration correction coefficients k4 to k5 are coefficients for correcting aberrations of the lenses with respect to a direction perpendicular to the radial direction thereof.

<Configuration of Image Processing Apparatus 200A>

As shown in FIG. 1, the image processing apparatus 200A mainly includes a CPU 11A, an input/output part 41, an operation part 42, a display part 43, a ROM 44, a RAM 45, and a storage device 46. The image processing apparatus 200A is implemented by, for example, execution of a program in a general-purpose computer.

The input/output part 41 includes an input/output interface such as a USB interface, a multimedia drive, an interface such as a network adapter for the connection with a LAN or the internet, and the like. The input/output part 41 transmits and receives data to and from the CPU 11A. More specifically, the input/output part 41 supplies, for example, various control signals used for the CPU 11A to control the stereo camera 300, to the stereo camera 300 connected to the input/output part 41 via the data line DL or the like. The input/output part 41 supplies the base image 21 and the reference image 22 obtained as a result of capturing images by the stereo camera 300, to the image processing apparatus 200A. Also by receiving a storage medium such as an optical disk in which the base image 21 and the reference image 22 are stored in advance, the input/output part 41 can supply the base image 21 and the reference image 22 to the image processing apparatus 200A.

The operation part 42 includes, for example, a keyboard or a mouse. An operator operates the operation part 42, and thereby setting of various control parameters given to the image processing apparatus 200A, setting of various operation modes of the image processing apparatus 200A, and the like, are performed. Function sections of the image processing apparatus 200A are configured so as to perform a process in accordance with each operation mode set by the operation part 42.

The display part 43 includes, for example, a liquid crystal display or the like. The display part 43 displays various types of image information including the base image 21 and the reference image 22 supplied from the stereo camera 300, the pseudo image 25 (FIG. 2) generated by the image processing apparatus 200A, and the like. The display part 43 also displays various types of information concerning the image processing system 100A, a control GUI (Graphical User Interface), and the like.

The ROM (Read Only Memory) 44 is a read only memory, and stores a program for operating the CPU 11A, and the like. Instead of the ROM 44, a non-volatile memory (for example, a flash memory) of random access type may be used.

The RAM (Random Access Memory) 45 is a volatile memory of random access type. The RAM 45 functions as an image storage, a work memory, and the like. The image storage is for temporarily storing various images obtained by the image processing apparatus 200A, a pseudo image and distance information (distance image) generated by the image processing apparatus 200A, and the like. The work memory is for temporarily storing processing information of the CPU 11A.

The storage device 46 includes, for example, a non-volatile memory of random access type such as a flash memory, a hard disk device, or the like. The storage device 46 permanently records information including various control parameters and various operation modes of the image processing apparatus 200A. The storage device 46 also stores information specifying a smoothing filter that is used for a blurring process performed by a first generation section 14A, and in other words, information specifying the type of the smoothing filter, the strength of the smoothing, and the like, or various types of information concerning a smoothing process such as a program corresponding to the smoothing process.

The CPU (Central Processing Unit) 11A is a control processing device that collectively controls function sections of the image processing apparatus 200A. The CPU 11A performs a control and a process in accordance with a program stored in the ROM 44. The CPU 11A also functions as a first acquisition section 12, a second acquisition section 13, a first generation section 14A, a second generation section 15A, a third acquisition section 16, an identification section 17A, a first vector acquisition section 18, and a second vector acquisition section 19, as will be described later.

By means of these function sections and the like, the CPU 11A generates, based on the base image 21 (FIG. 2) of the object captured from a base perspective, the pseudo image 25 (FIG. 2) of the object which corresponds to image-capturing from the virtual perspective different from the base perspective. Additionally, the CPU 11A controls an image capturing operation of the stereo camera 300, and also controls the display part 43 such that various images, results of calculation, various types of control information, and the like, are displayed on the display part 43.

The CPU 11A, the input/output part 41, the operation part 42, the display part 43, the ROM 44, the RAM 45, the storage device 46, and the like, are electrically connected to one another via a signal line 49. Therefore, the CPU 11A can control the stereo camera 300 and obtain image information from the stereo camera 300 via the input/output part 41, and also can make a display on the display part 43, at predetermined timings.

In an exemplary configuration shown in FIG. 1, each of the function sections, namely, the first acquisition section 12, the second acquisition section 13, the first generation section 14A, the second generation section 15A, the third acquisition section 16, the identification section 17A, the first vector acquisition section 18, and the second vector acquisition section 19, is implemented by the CPU 11A executing a predetermined program. Instead, however, these function sections may be implemented by, for example, hardware circuits dedicated therefor.

<Operation of Function Sections of Image Processing Apparatus 200A>

<Regarding Outline of Operation of Image Processing Apparatus 200A>

FIG. 2 is a block diagram showing one example of a principal function configuration of the image processing apparatus 200A according to the embodiment. The image processing apparatus 200A obtains pieces of base distance information 27 (FIG. 2) that constitute distance information about the object, based on the base image 21 (FIG. 2) and the reference image 22 (FIG. 2). Furthermore, the image processing apparatus 200A generates the pseudo image 25 (FIG. 2) based on the base image 21 and the pieces of the base distance information 27, and then generates a stereoscopic image 26 (FIG. 2).

An outline of the operation of the image processing apparatus 200A will be described with reference to FIG. 2. In a process for generating the stereoscopic image 26 by the image processing apparatus 200A, firstly, the first acquisition section 12 obtains the base image 21 obtained by the stereo camera 300 capturing an image of the object. Then, the second acquisition section 13 obtains pieces of the base distance information 27, each of which represents distance information about the distance from a predetermined origin position, such as the optical center 73a (FIG. 3) of the base camera 61, to each of the points on the object corresponding to the respective pixels of the base image 21. An image obtained by arranging the pieces of the base distance information 27 in conformity with an arrangement of the pixels of the base image 21 is an original distance image 31 (FIG. 2).

After the base image 21 and the pieces of the base distance information 27 (original distance image 31) are obtained, the identification section 17A performs an identification process in which image spaces each corresponding to each of the base image 21 and the original distance image 31 are classified into a gaze area and a non-gaze area and identified based on a predetermined criterion. The gaze area is an area that is determined to include a main object of the object. The non-gaze area is an area except the gaze area. Then, the identification section 17A generates area information 2a (FIG. 2) specifying a range of the non-gaze area in the image space. In a case where the base images 21 obtained as a result of chronological image-capturing are obtained, the first vector acquisition section 18 (FIG. 2) and the second vector acquisition section 19 (FIG. 2) generate a two-dimensional movement vector 91 (FIG. 2) and a three-dimensional movement vector 92 (FIG. 2), respectively, in accordance with the operation mode that has been set, as will be described later. It may be also possible that the identification section 17A performs the identification process by using the two-dimensional movement vector 91 and the three-dimensional movement vector 92.

After the area information 2a is generated, the first generation section 14A performs, based on the area information 2a, a blurring process, which will be described later, on an image in an area corresponding to the non-gaze area of at least one of the base image 21 and the original distance image 31. As a result of the blurring process, the first generation section 14A generates a derived image 24 (FIG. 2) corresponding to the base image 21 and pieces of derived distance information 28 (derived distance image 32) (FIG. 2) corresponding to the pieces of the base distance information 27.

After the derived image 24 and the pieces of the derived distance information 28 (derived distance image 32) are generated, the second generation section 15A generates the pseudo image 25 (FIG. 2) of the object which corresponds to image-capturing from the virtual perspective that is different from the perspective from which the base image 21 has been captured. After the pseudo image 25 is generated, the third acquisition section 16 (FIG. 2) obtains, as the stereoscopic image 26, the base image 21 and the pseudo image 25, and causes the obtained stereoscopic image 26 to be displayed on the display part 43. It may be also possible that the third acquisition section 16 obtains, as the stereoscopic image 26, a left-eye pseudo image and a right-eye pseudo image that are generated based on the base image 21 by the second generation section 15A.

As described above, in the process for generating the stereoscopic image 26 by the image processing apparatus 200A, images in the gaze areas of the derived image 24 and the derived distance image 32 are generated based on images in the gaze areas of the base image 21 and the original distance image 31, respectively, on which the blurring process has not been performed. Accordingly, as for the image quality such as the coloration, the brightness, and the like, of portions of the pseudo image 25 corresponding to the gaze area, the image quality of the image of the object in the gaze area of the base image 21 is maintained. As for parallaxes between the base image 21 and the portions of the pseudo image 25 corresponding to the gaze area, the distances of the respective portions of the object corresponding to the gaze area are maintained and reflected. This enables the observer who observes the portions of the stereoscopic image 26 corresponding to the gaze area to recognize a stereoscopic image in which the original image quality and sense of distance about the object are maintained.

On the other hand, at least one of the image in the non-gaze area of the derived image 24 and the image in the non-gaze area of the derived distance image 32 is generated based on the image in the non-gaze area of the base image 21 or the image in the non-gaze area of the original distance image 31, on which the blurring process has been performed. Accordingly, as for portions of the pseudo image 25 corresponding to the non-gaze area, at least one of phenomena occurs, namely, a phenomenon in which the image of the object in the non-gaze area of the base image 21 is blurred and a phenomenon in which a variation in the parallaxes between the base image 21 and the pseudo image 25, which are based on the distances of the respective portions of the object corresponding to the non-gaze area of the original distance image 31, is reduced. As a result, the observer who observes portions of the stereoscopic image 26 corresponding to the non-gaze area recognizes a stereoscopic image in which a spatial variation of stereoscopic image information is gentle so that the amount of visual information is reduced.

Accordingly, the observer who observes the stereoscopic image 26 generated by the image processing apparatus 200A is able to recognize a stereoscopic image of the object in which the original image quality and sense of distance are maintained in the gaze area. Additionally, since the amount of visual information concerning a stereoscopic view is reduced in the non-gaze area, the fatigue of the eyes due to overabundance and mixing of visual information concerning the stereoscopic view in the non-gaze area can be reduced. Here, the visual information concerning the stereoscopic view is, for example, the coloration, the brightness, the distance information, and the like.

<Details of Operation of Image Processing Apparatus 200A>

Figure 5:
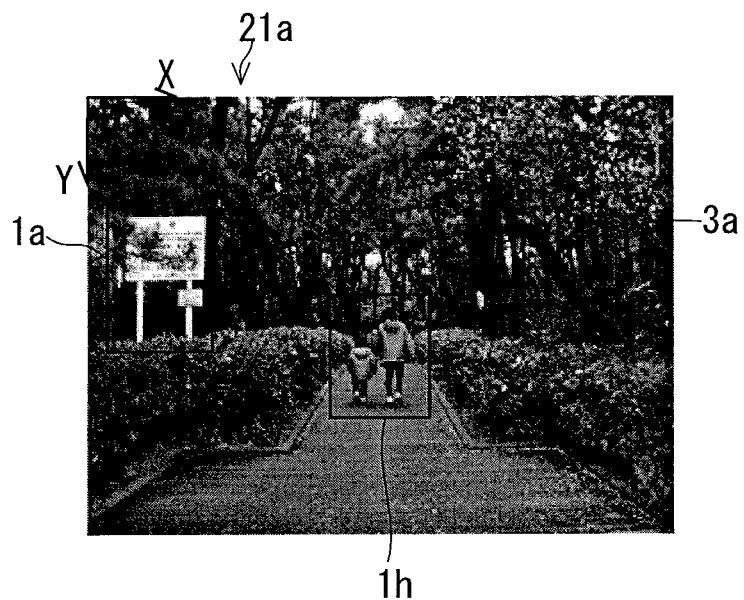
FIG. 5 shows one example of a base image.
Figure 6:
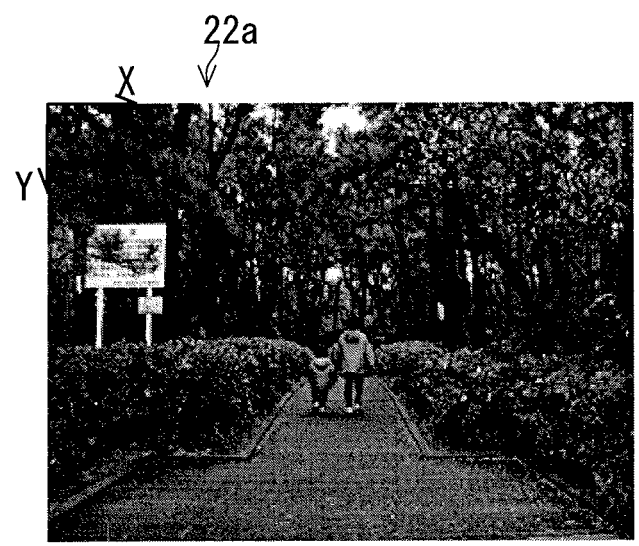
FIG. 6 shows one example of a reference image.

FIGS. 5 and 6 are diagrams showing a base image 21*a* and a reference image 22*a*, as one example of the base image 21 (FIG. 2) and the reference image 22 (FIG. 2) obtained by capturing images of the object by the base camera 61 and the reference camera 62 of the stereo camera 300 according to the embodiment. FIG. 21 is a diagram illustrating an operational flow of the image processing apparatus 200A according to the embodiment. In the following, with reference to the operational flow shown in FIG. 21 as appropriate, operations of the function sections of the image processing apparatus 200A will be detailed by taking, as an example, a case where the image processing apparatus 200A generates, based on the base image 21 and the reference image 22, the pseudo image 25 (FIG. 2) corresponding to image-capturing of the object from the virtual perspective different from the perspective from which the base image 21 has been captured.

Prior to capturing an image of the object for which the pseudo image corresponding to image-capturing from the virtual perspective should be generated, the position and attitude of the stereo camera 300 are adjusted so as to allow the object to be imaged from both of the base camera 61 and the reference camera 62. The base perspective from which the base image 21 has been captured is, for example, the optical center (such as the position of the principal point) of the image-capturing optical system of the base camera 61. When, under the condition that the position and attitude of the stereo camera 300 has been adjusted, a control signal for causing the stereo camera 300 to perform an image-capturing operation is supplied from the CPU 11A to the stereo camera 300 in response to, for example, an operation performed by the operator, the stereo camera 300 performs the image-capturing operation. After the image-capturing operation is completed, the base image 21 and the reference image 22, which are obtained as a result of the image-capturing by the base camera 61 and the reference camera 62, respectively, and which constitute a stereo image of the object, are generated and supplied to the input/output part 41 of the image processing apparatus 200A.

Operation of First Acquisition Section 12:

After the base image 21 of the object and the reference image 22 of the object are supplied to the input/output part 41, the first acquisition section 12 (FIG. 2) obtains the base image 21 via the input/output part 41 (step S110 in an operational flow S100A shown in FIG. 21), and also obtains the reference image 22. Since the direction of the base line length between the base camera 61 and the reference camera 62 is along the vertical scanning direction (Y-axis direction in FIGS. 5 and 6), the base image 21 and the reference image 22 cause a parallax along the Y-axis direction as shown in the base image 21*a* (FIG. 5) and the reference image 22*a* (FIG. 6). In FIGS. 5 and 6, the coordinate axes of the image coordinate systems for the base image 21*a* and the reference image 22*a*, respectively, are given. In the other drawings of the present application as well, the coordinate axes are sometimes appropriately given and used for descriptions. It may be acceptable that the first acquisition section 12 obtains via the input/output part 41 the base image 21 and the reference image 22 that have been captured and saved in a recoding medium in advance. The obtained base image 21 is supplied to the second acquisition section 13, the first generation section 14A, the second generation section 15A, the third acquisition section 16, the identification section 17A, the first vector acquisition section 18, and the second vector acquisition section 19. The reference image 22 is supplied to the second acquisition section 13.

Figure 7:
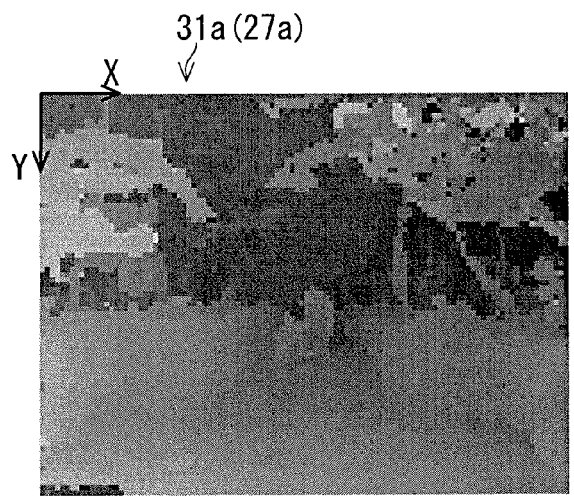
FIG. 7 shows one example of an original distance image.

Operation of Second Acquisition Section 13:

FIG. 7 is a diagram showing an original distance image 31*a* (pieces of the base distance information 27*a*), as one example of the original distance image 31 (pieces of the base distance information 27) (FIG. 2) obtained by the second acquisition section 13 (FIG. 2). After the base image 21 and the reference image 22 are supplied to the second acquisition section 13, the second acquisition section 13 performs a matching process using the correlation calculation method, or the like, on the base image 21 and the reference image 22, and thereby identifies each corresponding pixel of the reference image 22 which corresponds to each focused pixel of the base image 21. Even when the matching process therebetween is performed on a pixel basis or on a sub-pixel basis that is equal to or less than the pixel basis, the usability of the present invention is not impaired. As the correlation calculation method used in the matching process for identifying a corresponding pixel of the reference image 22 which corresponds to the focused pixel of the base image 21, for example, the NCC (Normalized Cross Correlation) method, the SAD (Sum of Absolute Difference) method, the POC (Phase Only Correlation) method, or the like, is adopted. In a case where the base camera 61 and the reference camera 62 have different image-capturing magnifications, the second acquisition section 13 reduces the resolution of the image captured with a high magnification in accordance with the ratio (also referred to as "image-capturing magnification ratio") of the image-capturing magnification of the camera having a higher image-capturing magnification to the image-capturing magnification of the camera having a lower image-capturing magnification. Additionally, the second acquisition section 13 extracts, from the image captured with a lower magnification, a partial image in which the number of pixels and the shape of pixel arrangement are the same as the number of pixels and the shape of pixel arrangement of the image with the reduced resolution. The partial image and the image with the reduced resolution are subjected to the matching process. Alternatively, it may be also acceptable that the second acquisition section 13 increases the resolution of the image captured with a lower magnification in accordance with the image-capturing magnification ratio, through a pixel value interpolation process or the like, and additionally extracts, from the image with the increased resolution, a partial image in which the number of pixels and the shape of pixel arrangement are equal to the number of pixels and the shape of pixel arrangement of the image captured with a higher magnification. This partial image and the image captured with a higher magnification may be subjected to the matching process.

After each corresponding pixel is identified, the second acquisition section 13 performs, with respect to each focused pixel of the base image 21, a process for obtaining a different (in the present application, also referred to as "parallax") between pixel coordinates of the focused pixel in the image coordinate system of the base image 21 and pixel coordinates of the corresponding pixel in the image coordinate system of the reference image 22. This process is performed for a focused pixel and a corresponding pixel that correspond to each other.

As shown in the expression (1), the parallax is an index value of the distance from the optical center 73a (FIG. 3) to a point on the object. In the present application, the term "distance information" is used as a collective term for the parallax and the distance. In the pieces of the base distance information 27, the parallax of the piece of the base distance information 27 is associated with the pixel coordinates of each corresponding pixel of the base image 21. Accordingly, the pieces of the base distance information 27 can be obtained in the form of, for example, the original distance image 31 in which the pieces of the base distance information 27 are arranged in accordance with the pixel arrangement in the base image 21. The pieces of the base distance information 27 (original distance image 31) obtained by the second acquisition section 13 are supplied to the identification section 17A, the first generation section 14A, and the second vector acquisition section 19.

As shown in the expression (1), the parallax d and the distance D can be converted into each other. Therefore, it may be possible that the second acquisition section 13 obtains, as the pieces of the base distance information 27, the distance of each point on the object which corresponds to each pixel of the base image 21, instead of each parallax described above. This distance can be obtained by, for example, performing the calculation of the expression (1) by the second acquisition section 13, or obtaining via the input/output part 41 the distance of each point on the object which is measured by another three-dimensional measurement machine, as will be described in the Section of modifications given later. In other words, the second acquisition section 13 obtains the piece of the base distance information 27 which expresses the distance information from a predetermined origin position to each point on the object corresponding to each pixel of the base image 21 (step S120 of FIG. 21).

Figure 17:
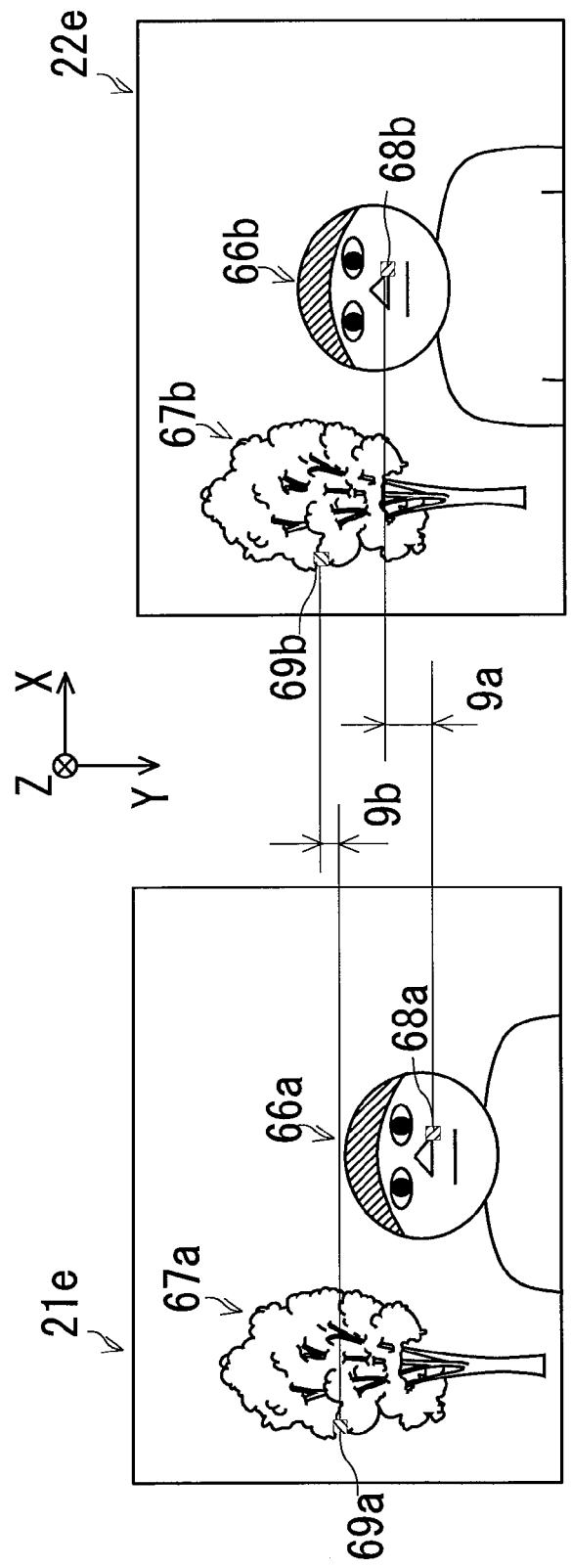
FIG. 17 is a diagram for explaining one example of a parallax between a base image and a reference image.

Example of Parallax:

FIG. 17 is a diagram for explaining one example of the parallax between a base image 21e and a reference image 22e. The base image 21e is one example of the base image 21 (FIG. 2) of the object captured by the base camera 61. The reference image 22e is one example of the reference image 22 (FIG. 2) of the object captured by the reference camera 62 that is arranged apart from the base camera 61 by a predetermined base line length with respect to the vertical direction (+Y direction in FIG. 17). In FIG. 17, to facilitate understanding of the parallax, the base image 21e and the reference image 22e are displayed side by side in the horizontal direction (X-axis direction in FIG. 17) such that the Y-coordinates of the upper end (lower end) of both of the images are coincident with each other.

In the base image 21e and the reference image 22e, foreground object images 66a and 66b of the same closer object that is positioned in the +Z side relative to the stereo camera 300 are captured, and background object images 67a and 67b of the same farther object that is located farther toward the +Z side from the stereo camera 300 than the closer object are captured. In FIG. 17, for easiness of the description, only an edge (outline) of each distinguishing portion of each object image is displayed. A pixel 68a on the foreground object image 66a and a pixel 68b on the foreground object image 66b are pixels corresponding to the same point on the closer object. A pixel 69a on the background object image 67a and a pixel 69b on the background object image 67b are pixels corresponding to the same point on the farther object. A parallax 9a is the parallax between the pixel 68a and the pixel 68b. A parallax 9b is the parallax between the pixel 69a and the pixel 69b. Because of a difference in the distances of the closer object and the farther object relative to the stereo camera 300, the parallax 9a and the parallax 9b have different values. In more detail, the parallax 9a corresponding to the closer object is larger than the parallax 9b corresponding to the farther object. In this manner, the magnitude of the parallax varies in accordance with the distance from the stereo camera 300 to a point on the object corresponding to a pixel on the image.

Next, prior to a description of an operation of the identification section 17A, a description will be given to operations of the first vector acquisition section 18 and the second vector acquisition section 19 that generate the two-dimensional movement vector 91 (FIG. 2) and the three-dimensional movement vector 92 (FIG. 2), respectively, which are appropriately used in accordance with an operation mode to which the identification section 17A is set.

Figure 14:
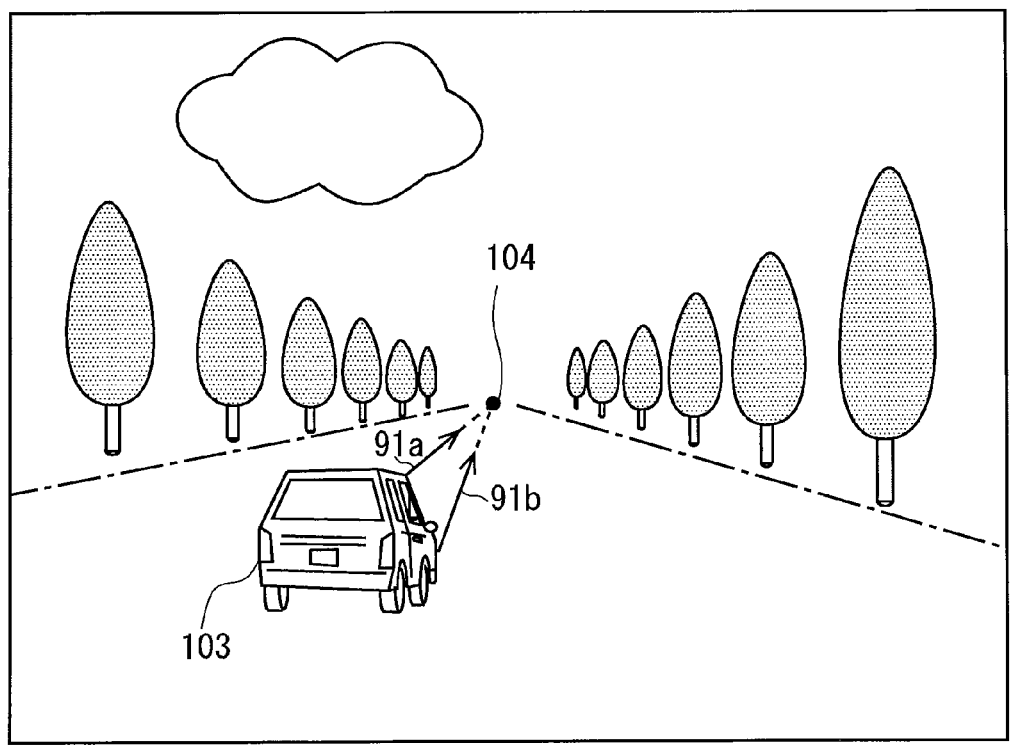
FIG. 14 is a diagram for explaining one example of a process for obtaining a two-dimensional movement vector.

Operation of First Vector Acquisition Section 18:

FIG. 14 is a diagram for explaining one example of a process for obtaining a two-dimensional movement vector by the first vector acquisition section 18 (FIG. 2). In FIG. 14, base images 21f and 21g are images of an object including a moving car 103 chronologically captured by the base camera 61 of the stereo camera 300 that is stationary. The base images 21f and 21g are displayed while overlapping each other in the same image space. The base image 21g is captured later than the base image 21f. The car 103 captured in the base image 21f is moving straight toward a vanishing point 104. Although the car 103 is captured in the base image 21g, too, a display of the car 103 in the base image 21g is omitted.

The two-dimensional movement vector 91 (FIG. 2) expresses, in the form of a vector, a movement caused when a plurality of images of the same object that have been chronologically captured are displayed in the same image space. The movement is caused between images corresponding to the same point on the object. In other words, the two-dimensional movement vector 91 is a movement vector obtained by projecting a movement vector of the same point on the object in a three-dimensional space such as a camera coordinate system C1 (FIG. 4), onto a two-dimensional space having no depth information, such as an Xc-Yc plane in the camera coordinate system C1. Corresponding pixels (corresponding points) of the base images that have been chronologically captured, both of which correspond to the same point on the object, are obtained by, for example, performing a corresponding point retrieval process using the already-described correlation calculation between the base images. Alternatively, the gradient method (gradient-based method) may be used to calculate the two-dimensional movement vector 91. In a process for calculating the two-dimensional movement vector 91 using the gradient method, it is not necessary to retrieve corresponding points, which can shorten a processing time. In a case where the base image 21 is obtained as chronological images, the first vector acquisition section 18 performs the process for obtaining a two-dimensional movement vector in accordance with the operation mode. Even when the two-dimensional movement vector 91 is obtained as a movement vector per unit time by using a time of capturing of each chronological image, the usability of the present invention is not impaired.

In FIG. 14, two two-dimensional movement vectors 91a and 91b are illustrated as an example of the two-dimensional movement vector 91. The two-dimensional movement vectors 91a and 91b are two-dimensional movement vectors between the base images 21f and 21g, and correspond to two different points on the car 103 captured in the base image 21f. Among the objects captured in the base image 21f, the objects other than the car 103 are stationary. Therefore, the two-dimensional movement vector 91 having a nonzero value is obtained only with respect to the car 103 that is a moving object. Accordingly, in a case where a camera is stationary, detection of the two-dimensional movement vector 91 having a nonzero value enables detection of a moving object in a captured image.

Since the car 103 is moving straight relative to the base camera 61, two-dimensional movement vectors obtained by extending the two-dimensional movement vectors 91a and 91b, respectively, cross each other at one vanishing point (Focus of Expansion: FOE) 104, as shown in FIG. 14. For example, the vanishing point 104 is calculated by solving, using the least squares method, a plurality of simultaneous equations of lines each expressing a two-dimensional movement vector corresponding to each of a plurality of points on the same object. A vanishing point is a fixed point defined by a direction of movement of each object relative to a camera. Even in a case where a camera captures chronological images while moving, the vanishing point about an object that is moving relative to the camera is normally located at a position different from the vanishing point about a stationary object. Accordingly, even in a case where a camera is moving, use of the vanishing point enables detection of a moving object that is moving relative to the camera along a direction different from the direction of movement of a stationary object.

Figure 15:
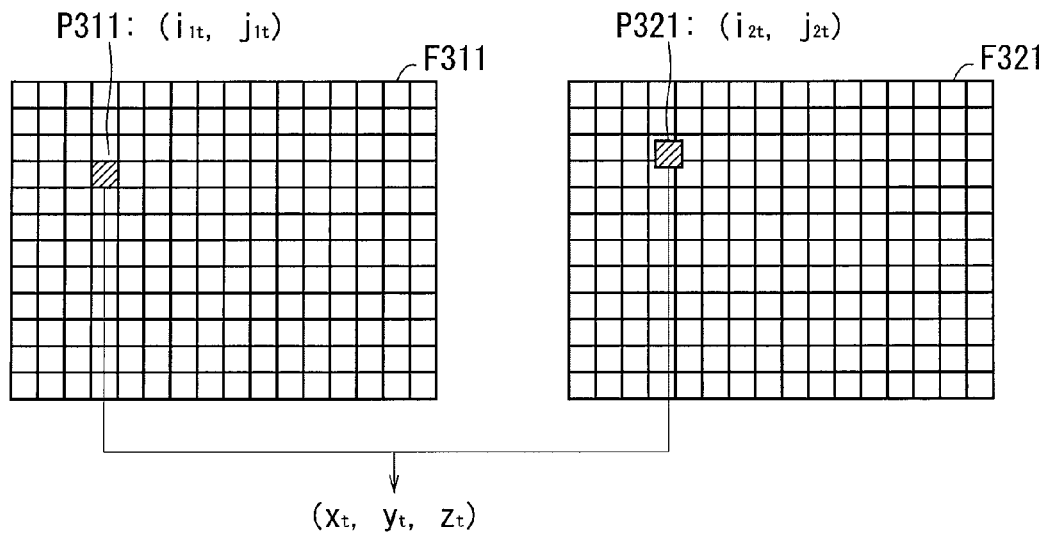
FIG. 15 is a diagram for explaining one example of a process for calculating a three-dimensional movement vector.
Figure 16:
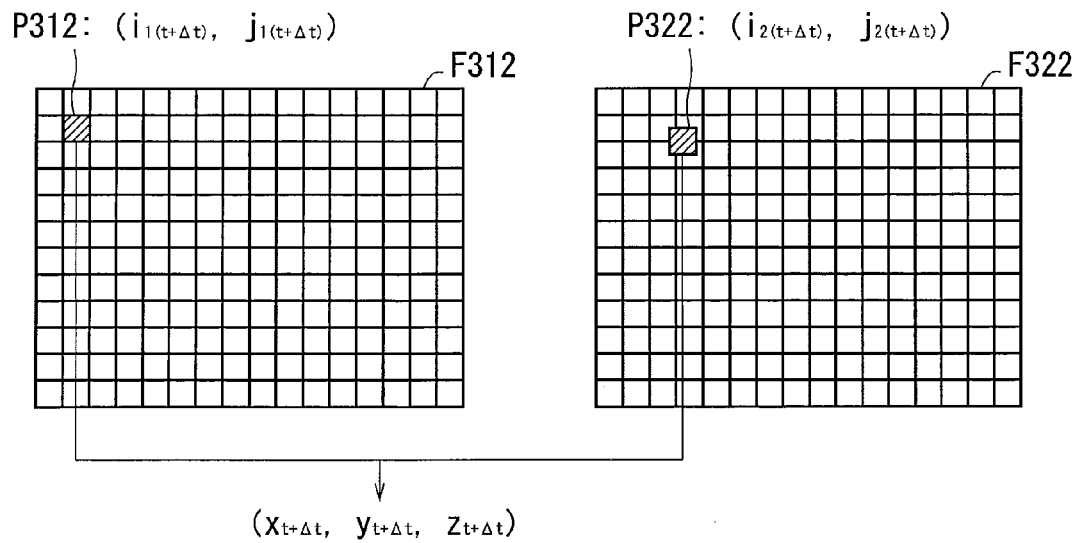
FIG. 16 is a diagram for explaining one example of the process for calculating a three-dimensional movement vector.

Operation of Second Vector Acquisition Section 19:

FIGS. 15 and 16 are diagrams for explaining one example of a process for calculating a three-dimensional movement vector by the second vector acquisition section 19 (FIG. 2). In FIGS. 15 and 16, base images F311 and F312 and reference images F321 and F322 are shown in a simplified manner. Herein, each of the images has a grid-like pixel arrangement with 2592 pixels in the vertical direction and 3456 pixels in the horizontal direction.

The base image F311 and the reference image F321, which are obtained by the first acquisition section 12, are images of an object captured at a time t by the base camera 61 and the reference camera 62, respectively, of the stereo camera 300. The base image F312 and the reference image F322, which are obtained by the first acquisition section 12, are images of the same object captured at a time t+Δt by the base camera 61 and the reference camera 62, respectively, of the stereo camera 300. To facilitate the description, in the base images F311 and F312 and the reference images F321 and F322, a display of the captured image of the object is omitted. The object is moving relative to the stereo camera 300. In a case where the base image 21 and the reference image 22 are obtained as chronological images, the second vector acquisition section 19 performs the process for obtaining a three-dimensional movement vector.

In this method, the second vector acquisition section 19, or the like, sequentially performs the following steps (a-1) to (a-4), and thereby a three-dimensional movement vector of an object captured in a base image is obtained.

(a-1) As shown in FIG. 15, the second acquisition section 13 performs the matching process using, for example, the already-described correlation calculation between the base image F311 and the reference image F321 that have been captured at the time t by the stereo camera 300. As a result, with respect to a point P311 on the base image F311 represented by coordinates $(i_{1t}, j_{1t})$, coordinates $(i_{2t}, j_{2t})$ of a point P321 on the reference image F321, which corresponds to the point P311, are detected. The point P321 captures the same portion of the object as the point P311 captures. Then, a parallax between the coordinates $(i_{1t}, j_{1t})$ of the point P311 and the coordinates $(i_{2t}, j_{2t})$ of the point P321, which means distance information, is obtained. The obtained parallax is supplied to the second vector acquisition section 19. Based on the parallax between the coordinates $(i_{1t}, j_{1t})$ of the point P311 and the coordinates $(i_{2t}, j_{2t})$ of the point P321, the second vector acquisition section 19 obtains three-dimensional coordinates $(x_t, y_t, z_t)$ of the portion of the object corresponding to the point P311 and the point P321, by using the already-described expressions (1) and (2).

(a-2) The second acquisition section 13 performs the matching process between the base image F311 captured at the time t by the stereo camera 300 and the base image F312 captured by the stereo camera 300 at the time t+Δt which is a time coming after the elapse of a time period Δt from the time t. As a result, with respect to a point P311 on the base image F311 represented by coordinates $(i_{1t}, j_{1t})$, coordinates $(i_{1(t+\Delta t)}, j_{1(t+\Delta t)})$ of a point P312 on the base image F312, which corresponds to the point P311, are detected. The point P312 captures the same portion of the object as the point P311 captures.

(a-3) A shown in FIG. 16, the second acquisition section 13 performs the matching process between the base image F312 and the reference image F322 captured at the time t+Δt by the stereo camera 300. As a result, with respect to a point P312 on the base image F312 represented by coordinates $(i_{1(t+\Delta t)}, j_{1(t+\Delta t)})$, coordinates $(i_{2(t+\Delta t)}, j_{2(t+\Delta t)})$ of a point P322 on the reference image F322, which corresponds to the point P312, are detected. The point P322 captures the same portion of the object as the point P312 captures. Consequently, the parallax between the coordinates $(i_{1(t+\Delta t)}, j_{1(t+\Delta t)})$ of the point P312 and the coordinates $(i_{2(t+\Delta t)}, j_{2(t+\Delta t)})$ of the point P322, which means distance information, is obtained. The obtained parallax is supplied to the second vector acquisition section 19. Based on the parallax between the coordinates $(i_{1(t+\Delta t)}, j_{1(t+\Delta t)})$ of the point P312 and the coordinates $(i_{2(t+\Delta t)}, j_{2(t+\Delta t)})$ of the point P322, the second vector acquisition section 19 obtains three-dimensional coordinates $(x_{t+\Delta t}, y_{t+\Delta t}, z_{t+\Delta t})$ of the portion of the object corresponding to the point P312 and the point P322, by using the already-described expressions (1) and (2).

(a-4) Based on the three-dimensional coordinates $(x_t, y_t, z_t)$ of the portion of the object at the time t and the three-dimensional coordinates $(x_{t+\Delta t}, y_{t+\Delta t}, z_{t+\Delta t})$ of the portion of the object at the time t+Δt, the second vector acquisition section 19 obtains, as a three-dimensional movement vector, the size of the portion of the object and a direction of movement of the portion of the object relative to the stereo camera 300 in a three-dimensional space. Even in a case where the second vector acquisition section 19 uses the time period Δt to obtain the three-dimensional movement vector per unit time between the stereo camera 300 and the portion of the object, the usability of the present invention is not impaired.

In the steps (a-1) to (a-4) described above, the matching process between the base image and the reference image captured at the same time and the matching process between the base images captured at different times, are performed by the second acquisition section 13. However, even when various modifications are made to the configuration so that, for example, these matching processes are performed by the second vector acquisition section 19, the usability of the present invention is not impaired. Additionally, even when these matching processes are performed on a pixel basis or on a sub-pixel basis that is equal to or less than the pixel basis, the usability of the present invention is not impaired.

By using a three-dimensional movement vector, information of movement of each portion of an imaged object relative to a camera in a three-dimensional space can be obtained. Therefore, for example, it is possible to identify, in an imaged object, a portion that has made a three-dimensional movement different from the other portions, that is, a portion different from the other portions.

Operation of Identification Section 17A:

Next, an operation of the identification section 17A will be described. The identification section 17A (FIG. 2) performs an identification process in which image spaces each corresponding to each of the base image 21 and the original distance image 31 (pieces of the base distance information 27) are classified into a gaze area and a non-gaze area and identified based on a predetermined criterion (step S130 of FIG. 21). The gaze area is an area of the imaged object which is determined to include a main object. The non-gaze area is an area of the imaged object except the gaze area. As the identification process, the identification section 17A is able to perform various identification processes in accordance with various operation modes that have been set. In the following, various identification processes performed by the identification section 17A will be sequentially described.

Identification Process Based on Image Information of Image in which Information of Ray from Object is Captured:

In accordance with the operation mode that has been set, the identification section 17A performs an identification process based on image information of the base image 21 that is an image obtained by capturing an image of information of ray from the object. More specifically, the identification section 17A obtains color information, blur information, and the like, from the base image 21, and thereby calculates the gaze area.

Identification Process based on Color Information:

In a case where the operation mode corresponding to the identification process based on color information is set, the identification section 17A calculates a color histogram indicating a state of a statistical distribution of color information within a video image, in order to perform a scene analysis on the obtained base image 21. The identification section 17A extracts, from the calculated histogram, color information that satisfies a predetermined criterion, such as a criterion of having a frequency of 5% or more and 20% or less of the total number of pixels of the base image 21. Then, the identification section 17A classifies a portion of the base image 21 in which the extracted color information exists into a gaze area and identifies the gaze area, while classifying a portion of the base image 21 except the gaze area into a non-gaze area and identifies the non-gaze area.

For example, in the base image 21a (FIG. 5), a white signboard, an adult wearing red clothes, and a child wearing blue clothes are captured, and additionally green trees and gray road around the above-mentioned objects are captured. Therefore, in a case where the above-described identification process based on color information is applied to the base image 21a, gaze areas 1a and 1h corresponding to the signboard and persons, respectively, are identified as the gaze area, while a non-gaze area 3a that is an area of the base image 21a except the gaze areas 1a and 1h is identified. Alternatively, the identification section 17A may adopt such an identification process that the identification section 17A extracts, from the calculated color histogram, color information that is different from the color information having the highest frequency, and then classifies a portion of the base image 21 in which the extracted color information exists into a gaze area and identifies the gaze area, while classifying a portion of the base image 21 except the gaze area into a non-gaze area and identifies the non-gaze area.

Figure 8:
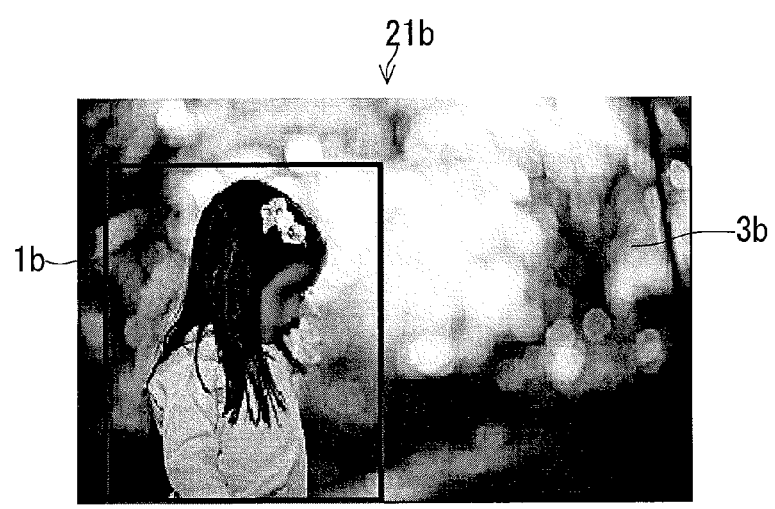
FIG. 8 shows one example of the base image.

FIG. 8 is a diagram showing, as one example of the base image 21, a base image 21b in which a person having black hair and wearing light-blue clothes and green trees that provide the background of the person are captured. The background trees in the base image 21b are imaged in a blurred manner because of the relationship between the depth of field of the base camera 61 and the distance of the trees. Accordingly, in a case where the above-described identification process based on color information is applied to the base image 21b, a gaze area 1b in which the person is captured and a non-gaze area 3b that is an area of the base image 21b except the gaze area 1b are identified.

It may be also possible that, for example, the identification section 17A binarizes each pixel of the base image 21 based on the predetermined criterion about the state of a statistical distribute of color information described above, and further perform a labeling process or the like, so that a connected area having a size equal to or larger than a criterion size is identified as a gaze area. Moreover, it may be also possible that the identification section 17A binarizes each pixel of the base image 21 based on a criterion of whether or not the pixel has a specific coloration, performs a labeling process or the like, and extracts connected areas having the coloration, so that, among the extracted connected areas, a connected area having a size equal to or larger than a criterion size is identified as a gaze area. As described above, the identification section 17A performs the above-described identification process on the base image 21 based on at least one of the state of a statistical distribution and the state of a spatial distribution of the coloration (color information) of the base image 21.

In another conceivable method, in a case where it is determined that a person area exists within the base image 21 due to a skin-color area extracted from the color information or a person detection algorithm, this area is identified as a gaze area. The reason for this is that it can be considered that, in a case where a person area having a certain size is included within an image, a photographer have taken an image while gazing a person.

Even in a case where, for example, an identification process for classifying an image into a gaze area and a non-gaze area and thus identifying these areas based on the state of a distribution of luminance information of the base image 21 is adopted instead of the above-described identification process based on color information, the usability of the present invention is not impaired. When such an identification process is adopted, the following may be acceptable. That is, in each of areas extracted as the gaze area, the luminance within the area and the luminance in a portion surrounding the area are checked. As a result of the check, for example, the gaze area whose luminance is higher than the surrounding area by 30% or higher is newly identified as the gaze area, while the gaze area that does not satisfy the condition is changed into the non-gaze area. This is because, in an imaging scene in which a low-luminance object and a high-luminance object are mixed, the observer is likely to gaze an area having a higher luminance Identification Process based on Blur Information of Image In a case where the operation mode corresponding to the identification process based on blur information of an image is set, the identification section 17A calculates blur information of the obtained base image 21, and calculates, as the gaze area, a position having a high clarity of a video image. More specifically, for example, the blur information can be identified as follows. That is, an edge (outline) within the image is detected, and the intensity of each detected edge is adopted as an index value that quantitatively represents the blurring state of an image, to thereby classify the base image 21 into a gaze area that is an area in which the edge is clearer than a predetermined criterion, and a non-gaze area that is an area except the gaze area. Since an image photographer normally places the focal point of a camera on a main object. Therefore, an image of the main object is normally not blurred, and an object different from the main object, which is out of a focusing range of the camera, is likely to be blurred.

It may be also possible that the identification section 17A performs a frequency analysis on the base image 21, to thereby classify the base image 21 into a gaze area including a main object, which is an area whose spatial frequency is higher than a predetermined criterion, and a non-gaze area that is an area except the gaze area, and identify the areas.

For example, in a case where the identification process based on blur information of the base image 21b (FIG. 8) is applied, image blurring occurs in the portion of the base image 21b serving as the background of the person area as has been already described, the gaze area 1b in which the person is captured and the non-gaze area 3b that is an area of the base image 21b except the gaze area 1b, in which blurring occurs, are identified.

Identification Process based on Area in Two-Dimensional Image:

In another possible identification process for classifying the base image 21 that is a two-dimensional video image into the gaze area corresponding to the main object and the non-gaze area that is an area except the gaze area and thus identifying these areas, the identification section 17A may perform such an operation that, based on area information that specifies a central portion of the base image 21, the central portion of the base image 21 is identified as the gaze area. This identification process is based on the fact that a main object is normally captured in a central portion of an image. Additionally, in a case where, for example, the angle of view of the base camera 61 that has captured the base image 21 is wider than the angle of a viewing field of the observer, the identification section 17A may perform such an identification process that the identification section 17A cuts out, from the central portion of the base image 21, only a range of the angle of the viewing field based on information of the range of the angle of the viewing field, and identifies the cut-out area as the gaze area, while identifying a portion of the base image 21 except the gaze area as the non-gaze area.

Figure 9:
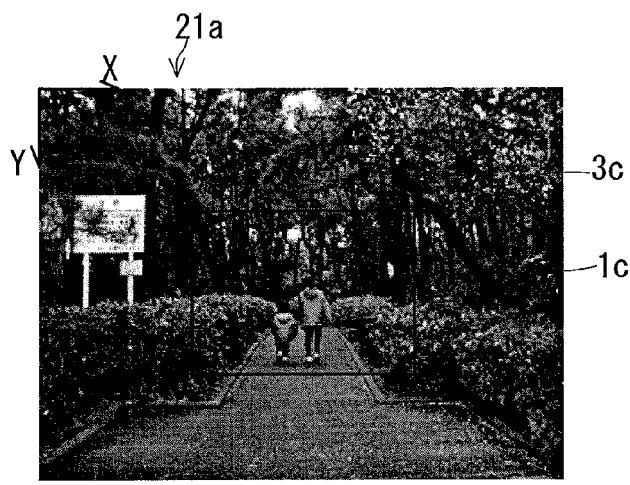
FIG. 9 shows one example of a gaze area and a non-gaze area in the base image.

FIG. 9 is a diagram showing one example of a gaze area and a non-gaze area that is an area of the base image 21a except the gaze area, which have been identified in the base image 21a. For example, in a case of, with respect to the area information that specifies the central portion, adopting a criterion that identifies, as the central portion, an area contained in a central 40% portion of the base image 21a with respect to each of the X-axis direction and the Y-axis direction, the base image 21a is classified into a gaze area 1c and a non-gaze area 3c and thus identified, as shown in FIG. 9.

Identification Process based on Two-Dimensional Movement Vector:

In a case where the operation mode is set that corresponds to the identification process for identifying the gaze area and the non-gaze area based on a two-dimensional movement vector of base images that have been chronologically captured, the identification section 17A detects a moving object within an object based on the two-dimensional movement vector 91 (FIG. 2) of each pixel of the base image 21, which is obtained by the first vector acquisition section 18. Thereby, the identification section 17A performs the identification process. The identification process based on a two-dimensional movement vector is based on the fact that, when there are a stationary object and a moving object, an observer normally gazes the moving object.

As has been already described in the Section describing the operation of the first vector acquisition section 18, in a case where a camera is stationary, the identification section 17A detects the two-dimensional movement vector 91 having a nonzero value, and thereby can detect a moving object within a captured image. Moreover, use of the vanishing point enables, even when a camera is moving, detection of a moving object that is moving relative to the camera along a direction different from the direction of movement of a stationary object. Accordingly, based on the two-dimensional movement vector 91, the identification section 17A can classify an image space of the base image 21 into a gaze area in which the moving object, that is, a main object, is captured, and a non-gaze area that is an area except the gaze area, and can identify the areas.

Figure 10:
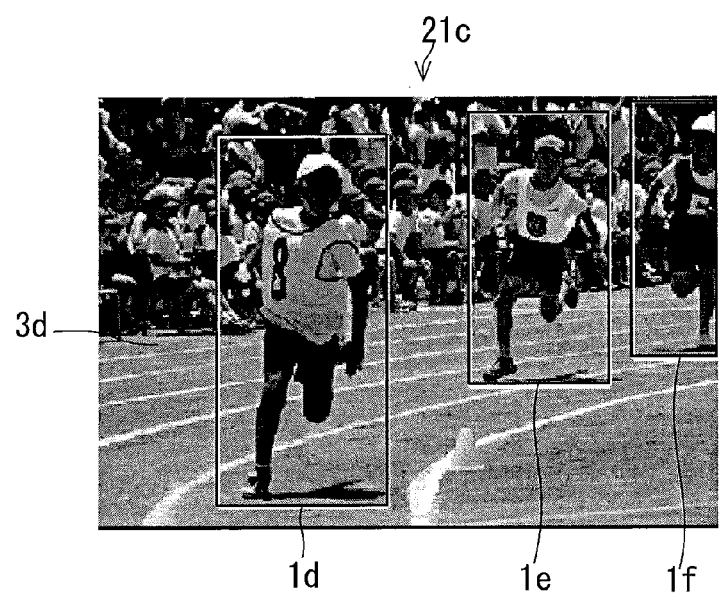
FIG. 10 shows one example of the base image.

FIG. 10 is a diagram showing a base image 21c as one example of the base image 21 (FIG. 2). In a case where, for example, the identification process based on a two-dimensional movement vector described above is applied to the base image 21c, gaze areas 1d, 1e, and 1f, in which three running persons are contained, are identified in the base image 21c. Additionally, a non-gaze area 3d that is an area except the identified gaze area is also identified.

Identification Process based on Distance Information:

In a case where the operation mode corresponding to the identification process for identifying the gaze area and the non-gaze area based on the distance information about the base image 21, that is, based on a three-dimension stationary image, is set; the identification section 17A performs such an identification process by, for example, performing one of the following processes 1 to 5 that are based on the pieces of the base distance information 27 (original distance image 31) supplied from the second acquisition section 13.

Process 1: In the implementation of the process 1, the identification section 17A determines whether or not the pieces of the base distance information 27 supplied from the second acquisition section 13 is included in a distance range based on distance range information that has been set in advance and stored in the storage device 46 or the like. Thereby, the identification section 17A identifies, from an image space corresponding to the original distance image 31, a gaze area that is determined to include a main object and a non-gaze area that is an area except the gaze area. More specifically, for example, as information, among the above-described distance range information, that specifies a value at a short distance from the stereo camera 300, there is adopted the closest approach distance that allows a stereoscopic view due to the base line length of the stereo camera 300. On the other hand, as information, among the above-described distance range information, that specifies a value at a long distance from the stereo camera 300, there is adopted the distance closest to the stereo camera 300 within a distance range that does not give a stereognostic effect even when a display as a stereoscopic video image is made.

Adoption of the process 1 enables the identification section 17A to, for example, classify the non-gaze area into an area that is closer than the closest approach distance that allows a stereoscopic view due to the base line length of the stereo camera 300, and an area within the distance range that does not give a stereognostic effect even when a display as a stereoscopic video image is made. Therefore, by performing a process in which the first generation section 14A blurs an image in an area of the base image 21 corresponding to the area of the non-gaze area closer than the closest approach distance that allows a stereoscopic view described above, or by setting, to the closest approach distance that allows a stereoscopic view, each piece of the distance information of an area of the original distance image 31 corresponding to the closer area, the fatigue of the eyes of the observer caused when the observer observes the stereoscopic image 26 (FIG. 2) generated by the third acquisition section 16, can be reduced.

Process 2: In the implementation of the process 2, the identification section 17A performs an identification process for classifying an image space that corresponds to the original distance image 31, that is, to the original distance image 31, into a gaze area that is determined to include a main object and a non-gaze area that is an area except the gaze area, and thus identifying the areas, based on focusing distance information of a focusing distance in capturing the base image 21. In a case where, for example, an automatic focus camera is adopted as the base camera 61, the focusing distance information used for the identification process is obtained by the identification section 17A in the following manner, for example. That is, focusing distance information of a focusing distance in capturing the base image 21 is associated with the base image 21 and supplied to the image processing apparatus 200A. In the process 2, the identification section 17A estimates, from the original distance image 31, distance information of a distance that causes the camera to be in focus. Then, the identification section 17A can extracts, as the gaze area, only an area of the original distance image 31 in which pixel values correspond to the estimated distance information. Alternatively, the identification section 17A can extracts, as the gaze area, only an area of the original distance image 31 in which pixel values correspond to distance information in a range of 95% to 105% of the estimated distance information.

Process 3: In the implementation of the process 3, the identification section 17A performs the identification process for classifying an image space corresponding to the original distance image 31, that is, the original distance image 31, into a gaze area that is determined to include a main object and a non-gaze area that is an area except the gaze area and thus identifying the areas, in the following manner. That is, the identification section 17A considers that, in a connected area that is formed by connection of such pixels that a difference in the pieces of distance information is within a predetermined distance range in the original distance image 31 obtained by the second acquisition section 13, an area having a size equal to or larger than a predetermined size is the gaze area.

The identification section 17A can perform the identification process corresponding to the process 3 by, for example, dividing a range in which the pieces of distance information of the original distance image 31 are distributed into a plurality of zones and then sequentially performs, with respect to all of the zones obtained by the division, a process for identifying, in the original distance image 31, a connected area that has a size equal to or larger than a predetermined size and in which pieces of distance information belong to one of the plurality of zones.

Figure 11:
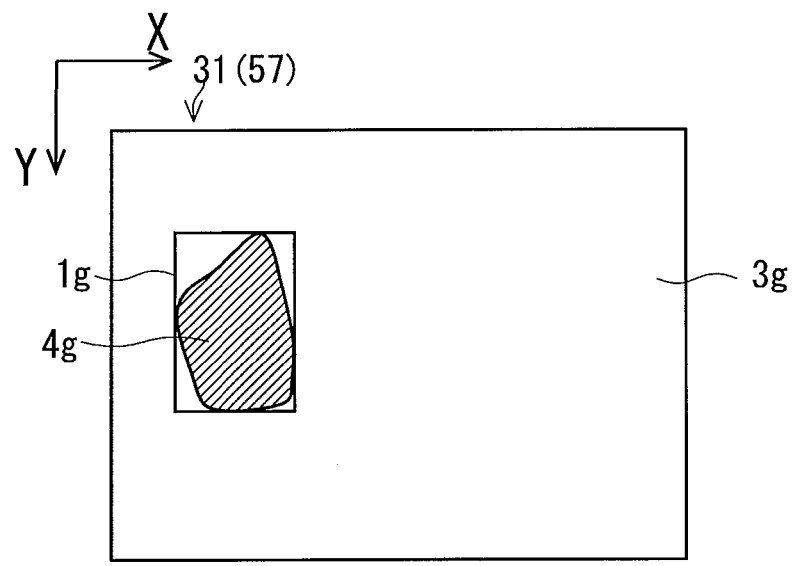
FIG. 11 is a diagram for explaining one example of a labeling process.

FIG. 11 is a diagram for explaining one example of a labeling process in the process 3 performed by the identification section 17A and in the process 4 which will be described later. The identification section 17A can implement the labeling process by, for example, processes (b-1) to (b-5) which will be described later.

(b-1) Firstly, the identification section 17A divides a range in which the pieces of distance information are distributed in the original distance image 31 into a plurality of zones. Then, the identification section 17A selects one of the zones, and binarizes a pixel value of each pixel of the original distance image 31 based on a criterion of whether or not the pixel value of each pixel of the original distance image 31, that is, the distance information, belongs to a distance range of the selected zone.

(b-2) Then, the identification section 17A performs the labeling process on the binarized original distance image 31, and identifies, in the original distance image 31, each of all the connected areas each of which is formed by connection of pixels whose pixel values, that is, whose distance information, belong to the distance range of the selected zone.

(b-3) Then, the identification section 17A determines whether or not each of the connected areas described above satisfies a predetermined criterion, based on a predetermined criterion concerning the size of the connected area. Then, the identification section 17A extracts all connected areas that satisfy the criterion. For example, an area 4g in FIG. 11 illustrates a connected area in a case where the number of connected areas identified as a result of the extraction is one. Examples of the criterion include a criterion that, among the connected areas, an area having a size of 5% or more of the size of the original distance image 31 should be identified.

(b-4) For example, the identification section 17A identifies position information of the area 4g with respect to the X-axis and Y-axis directions, and identifies a rectangular area containing the area 4g as a gaze area 1g for the selected one of the plurality of zones that are obtained as a result of dividing of the range in which the pieces of distance information of the original distance image 31 are distributed. An area 3g that is an area of the original distance image 31 except the gaze area 1g is an area equivalent to a non-gaze area of the selected one zone. Even when the identification section 17A directly identifies the area 4g as the gaze area without setting such a rectangular area, the usability of the present invention is not impaired.

(b-5) The identification section 17A performs the above-described processes (b-1) to (b-4) with respect to each of the plurality of zones that are obtained as a result of dividing of the range in which the pieces of distance information of the original distance image 31 are distributed. Thereby, the identification section 17A identifies all the gaze areas in the entire range in which the pieces of distance information of the original distance image 31 are distributed. The identification section 17A identifies, as the non-gaze area, an area of the original distance image 31 except the all the identified gaze areas.

For example, in the base image 21c shown in FIG. 10, the distances from the stereo camera 300 to the three persons are different from one another. Here, in a case where the above-described labeling process in the process 3 is applied to the base image 21c shown in FIG. 10, the gaze areas 1d, 1e, and 1f of the base image 21c that contain the three running persons are identified, and the non-gaze area 3d of the base image 21c except the identified gaze areas is also identified.

In the process 3, as described above, only the connected area that has a size equal to or larger than a predetermined size and that is formed by connection of such pixels that a difference in the pieces of distance information is within a predetermined distance range in the original distance image 31 is identified as the gaze area. Accordingly, even a connected area of the original distance image 31, in which such pixels that a difference in the pieces of distance information is within the predetermined distance range are connected, is classified into the non-gaze area if the size of the connected area is smaller than the predetermined criterion. The first generation section 14A performs a blurring process, which will be described later, on an area of at least one of the base image 21 and the original distance image 31 which corresponds to the gaze area. Based on the base image 21 and the original distance image 31 obtained at a time when the blurring process is completed, a pseudo image is generated through a process performed by the second generation section 15A, and then is supplied to a stereoscopic view display. Therefore, with respect to the above-described connected area having a size smaller than the predetermined criterion, a stereognostic effect given to the observer is reduced. This can reduce the fatigue of the eyes of the observer, which may occur due to flickering caused by overabundance and mixing of information concerning a stereoscopic view of this connected area.

Process 4: In the implementation of the process 4, the identification section 17A performs the following identification process. That is, the identification section 17A identifies, as the gaze area, an area having the largest size among connected areas each formed by connection of such pixels that a difference in the distance information is within a predetermined distance range in the original distance image 31 obtained by the second acquisition section 13. Thereby, the identification section 17A classifies an image space corresponding to the original distance image 31, that is, the original distance image 3, into a gaze area that is determined to include a main object and a non-gaze area that is an area except the gaze area, and thus identifying the areas. More specifically, for example, the identification section 17A performs the above-described processes (b-1) to (b-5) in the process 3, and then identifies, as a sole gaze area, a gaze area having the largest size among the gaze areas identified in the original distance image 31. Thereby, the identification section 17A can perform the process 4. Accordingly, if performing the process 4 by the identification section 17A enables the image processing apparatus 200A to reduce a stereognostic effect given to the observer with respect to a portion corresponding to a non-gaze area except the solely-identified gaze area of a stereoscopic image generated by the image processing apparatus 200A. This can further reduce the fatigue of the eyes of the observer due to flickering caused by the information concerning a stereoscopic view of this non-gaze area, as compared with a case where the process 3 is performed.

Process 5: In the implementation of the process 5, the identification section 17A performs the identification process for, based on the area information that specifies a range of a predetermined area in the image space of the original distance image 31 obtained by the second acquisition section 13, classifying an image space corresponding to the original distance image 31, that is, the original distance image 31, into a gaze area that is determined to include a main object and a non-gaze area that is an area except the gaze area, and thus identifying the areas. For example, the identification section 17A identifies, as the gaze area, an area of a central portion of the image space of the original distance image 31, based on a criterion that an area of the original distance image 31a shown in FIG. 7 which is contained in 40% of the central portion with respect to the X-axis and Y-axis directions. Performing the process 5 by the identification section 17A enables the image processing apparatus 200A to reduce a stereognostic effect given to the observer with respect to a portion corresponding to the non-gaze area of the stereoscopic image generated by the image processing apparatus 200A which is identified by the original distance image 31, that is, with respect to a surrounding portion that is a portion except the central portion. As a result, the fatigue of the eyes of the observer due to flickering in this portion can be reduced.

Identification Process based on Three-Dimensional Movement Vector:

In a case where the operation mode is set that corresponds to the identification process for identifying the gaze area and the non-gaze area based on a three-dimensional movement vector is set, the identification section 17A detects a moving object within an object based on the three-dimensional movement vector 92 (FIG. 2) of each pixel of the base image 21, which is obtained by the first vector acquisition section 18. Thereby, the identification section 17A performs the identification process for classifying an image space corresponding to each of the base image 21 and the original distance image 31 into a gaze area and a non-gaze area that is an area except the gaze area, and thus identifying the areas. Similarly to the identification process based on a two-dimensional movement vector, the identification process based on a three-dimensional movement vector is also based on the fact that, when there are a stationary object and a moving object, an observer normally gazes the moving object.

As has been already described in the Section describing the operation of the second vector acquisition section 19, use of a three-dimensional movement vector by the identification section 17A enables information of movement of each portion of an imaged object relative to a camera in a three-dimensional space to be obtained. Therefore, for example, the identification section 17A can identify, in an imaged object, a portion that has made a three-dimensional movement different from the other portions, that is, a portion different from the other portions, as a gaze area. The identification section 17A can also perform the identification process for identifying a moving object captured in the base image 21, that is, a gaze area, in the following manner. That is, the identification section 17A determines whether or not the magnitude of a three-dimensional movement vector, which means the amount of movement of each portion of the object, is equal to or greater than a predetermined threshold value. The predetermined threshold value is, for example, 10% of the distance from the stereo camera 300 to the object. This determination is performed with respect to each of the three-dimensional movement vectors 92 corresponding to the pixels of the base image 21.

Additionally, even when the identification section 17A performs the identification process in the following manner, the usability of the present invention is not impaired. That is, the identification section 17A classifies an image space corresponding to each of the base image 21 and the original distance image 31 into a gaze area and a non-gaze area that is an area except the gaze area and thus identifies the areas, based on a direction of movement of each portion of the object captured in the base image 21, that is, based on a direction of the three-dimensional movement vector 92.

Figure 12:
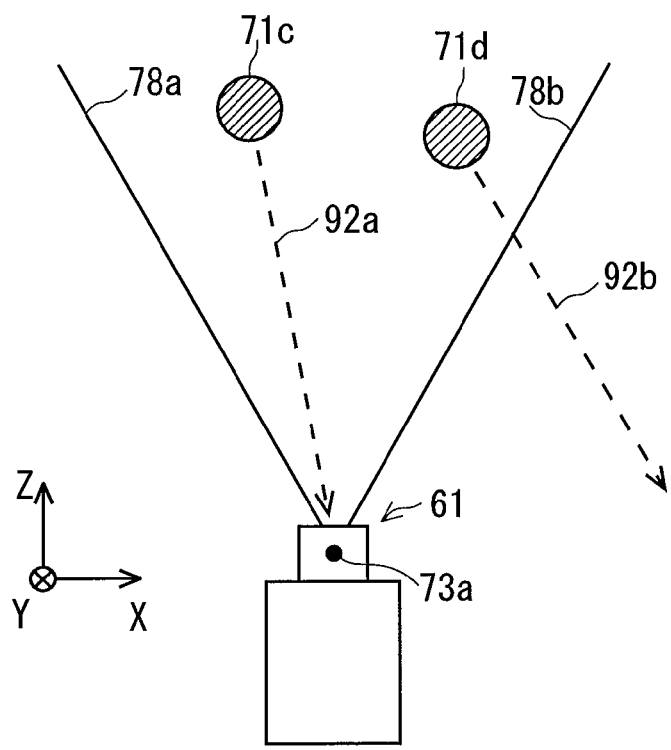
FIG. 12 is a diagram for explaining one example of a process for identifying a gaze area.

FIG. 12 is a diagram for explaining one example of a process in which the identification section 17A identifies the gaze area based on the direction of the three-dimensional movement vector 92. As shown in FIG. 12, in a shooting field of the base camera 61 which is defined by shooting field ends 78a and 78b each passing through the optical center 73a of the base camera 61, objects 71c and 71d are moving with elapse of time. Three-dimensional movement vectors 92a and 92b are three-dimensional movement vectors corresponding to the objects 71c and 71d, respectively, and obtained by the second vector acquisition section 19.

Here, an extension line of the three-dimensional movement vector 92a intersects with the base camera 61, but an extension line of the three-dimensional movement vector 92b does not intersect with the base camera 61. Thus, in the base images 21 obtained by chronological image-capturing of the objects 71c and 71d that are moving objects, an image of the object 71c becomes larger and approaches to a central portion of the base image 21 with elapse of time, while an image of the object 71d is disappearing from a screen of the base image 21 with elapse of time. In this case, the observer normally gazes the object 71c among the objects 71c and 71d that are moving objects.

Therefore, with respect to the object that is coming to the base camera 61 based on the three-dimensional movement vector 92, that is, with respect to the object whose three-dimensional movement vector 92 has its extension line intersecting with the base camera 61, the identification section 17A determines an area including an image of this object as a gaze area. On the other hand, with respect to the object that is going away along the three-dimensional movement vector 92 having its extension line not intersecting with the base camera 61, the identification section 17A determines an image of this object as a non-gaze area. Thereby, the identification section 17A performs the above-described identification process.

As a method for determining whether or not the three-dimensional movement vector 92 intersects with the base camera 61, for example, a method is adoptable in which a 3D area having substantially the same size as that of the base camera 61 is set in the position of the base camera 61, and whether or not each surface that forms an outer periphery of the 3D area intersects the extension line of the three-dimensional movement vector 92 is determined.

As described above, the identification section 17A performs the identification process for, in accordance with the operation mode that has been set, classifying the image space corresponding to each of the base image 21 and the original distance image 31 (pieces of the base distance information 27) into a gaze area of the imaged object that is determined to include a main object and a non-gaze area that is an area except the gaze area and thus identifying the areas. After the identification process is completed, the identification section 17A generates the area information 2a (FIG. 2) that specifies a range of the non-gaze area. The generated area information 2a is supplied to the second generation section 15A. Here, the operation mode of the identification section 17A is set in various manners. For example, the operator sets the operation mode through the operation part 42. Alternatively, the CPU 11A determines whether or not the base image 21 are chronological images.

In the above-described operation of the identification section 17A, the identification process has been illustrated as an example, in which an image space corresponding to each of the base image 21 and the original distance image 31 is identified by being classified into a gaze area of the imaged object that is determined to include a main object and a non-gaze area that is an area except the gaze area based on a criterion of extracting a gaze area from the base image 21. However, even when the identification section 17A performs the identification process based on a criterion of determining a non-gaze area among the base image 21 instead of the criterion of extracting a gaze area from the base image 21, the usability of the present invention is not impaired.

Operation of First Generation Section 14A:

The first generation section 14A, after the area information 2a is supplied thereto, performs the blurring process on an image in the area corresponding to the non-gaze area of at least one of the base image 21 and the original distance image 31 based on the area information 2a. As a result, the first generation section 14A generates the derived image 24 (FIG. 2) and the pieces of the derived distance information 28 (derived distance image 32) (FIG. 2) corresponding to the base image 21 and the pieces of the base distance information 27, respectively (step S140 of FIG. 21).

Here, in a case where the first generation section 14A performs the blurring process on the image in the area corresponding to the non-gaze area of only the base image 21 among the base image 21 and the original distance image 31, the first generation section 14A normally adopts the pieces of the base distance information 27 (original distance image 31) as the pieces of the derived distance information 28 (derived distance image 32) corresponding to the pieces of the base distance information 27. However, even in case where, for example, for the purpose of removing a random noise, a distance image obtained by performing, on the original distance image 31, a blurring process with a low degree of blurring that is equal to or less than 10% of the degree of blurring of the blurring process for blurring the non-gaze area is adopted as the derived distance image 32, the usability of the present invention is not impaired. In the same manner, in a case where the first generation section 14A performs the blurring process on the image in the area corresponding to the non-gaze area of only the original distance image 31 among the base image 21 and the original distance image 31, the first generation section 14A normally adopts the base image 21 itself as the derived image 24 corresponding to the base image 21. However, for example, even in case where, for example, for the purpose of removing a random noise, a distance image obtained by performing, on the base image 21, a blurring process with a low degree of blurring that is equal to or less than 10% of the degree of blurring of the blurring process for blurring the non-gaze area is adopted as the derived image 24, the usability of the present invention is not impaired.

As the blurring process that the first generation section 14A performs on image data of the base image 21, the original distance image 31, and the like, for example, a smoothing filter process using any of various smoothing filters such as an averaging filter, a median filter, and a Gaussian filter is adopted. The degree of smoothing by the smoothing filter is changeable by, for example, changing the size of the filter. Even in a case where, for example, the first generation section 14A performs, as the blurring process, a process for replacing a pixel value of each of the pixels in the area to be subjected to the blurring process with a representative value of the pixel values in the area, such as the average value of the pixel values of the pixels in this area; the usability of the present invention is not impaired.

Figure 13:
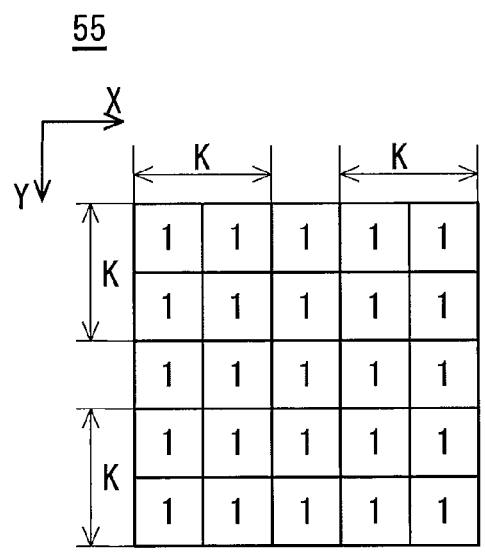
FIG. 13 is a diagram showing one example of an averaging filter 55.

FIG. 13 is a diagram showing one example of an averaging filter 55. In the averaging filter 55 shown in FIG. 13, each matrix element has a value of one. For the convenience of illustration, the averaging filter 55 is displayed with a size of 5×5 pixels (five rows and five columns). In the averaging filter 55, the filter size, and in other words, the degree of smoothing, varies in accordance with the value of a parameter K that specifies the number of pixels (the number of elements) with respect to the X direction and the Y direction. In a case where the averaging filter 55 is applied to image data that is an object on which the smoothing process is to be performed, the averaging filter 55 is overlaid on, in the image space corresponding to the image data that is an object of smoothing, an area centered at a focused pixel and having the same size as that of the averaging filter 55. Then, a multiply-accumulate operation is performed on the pixel values of the pixels in this area and the values of the matrix elements of the averaging filter 55 each opposed to each of the pixels. A result of this operation is divided by the number of pixels on which the multiply-accumulate operation has been performed. Then, a resulting value is replaced with the pixel value of the focused pixel. In a case where the averaging filter 55 is applied to the blurring process for blurring the non-gaze areas of the base image 21 and the original distance image 31, for example, the value of the parameter K is set to be about 100 to 400 when the image size of the base image 21 and the original distance image 31 is 3456 pixels×2592 pixels.

Similarly to the identification section 17A, the first generation section 14A can perform various blurring processes described below, in accordance with the operation mode that has been set. The operation mode is set in various manners. For example, the operator sets the operation mode through the operation part 42. Alternatively, the first generation section 14A determines the operation mode of the identification section 17A, and thereby sets the operation mode.

Blurring Process 1:

In a case where the operation mode corresponding to the blurring process 1 is set, the first generation section 14A performs the blurring process on the image in the area of the original distance image 31 corresponding to the non-gaze area, that is, on the pieces of distance information, to thereby generate the pieces of the derived distance information 28. Additionally, in accordance with the operation mode, the first generation section 14A may perform such a process that the non-gaze area of the original distance image 31 is sorted into a closer area and a farther area, and the blurring processes with different degrees of blurring are performed on the closer area and the farther area, respectively. The closer area is such an area that each portion of the object captured in the non-gaze area is closer to the origin position of the distance information, that is, closer to the optical center 73a of the base camera 61, than the predetermined criterion distance. The farther area is an area at the farther side of the origin position beyond the criterion distance. In order to reduce the observer's uncomfortableness in observing the stereoscopic image 26, the degree of blurring the closer area is normally set lower than the degree of blurring the farther area. The criterion distance used for sorting into the closer area and an outer periphery area, for example, the average value of the pieces of distance information in the area of the original distance image 31 corresponding to the gaze area is adopted.

It may be also possible that the first generation section 14A performs one of the following blurring processes 1A to 1C in which details of the blurring process 1 are specified, in accordance with the operation mode. Irrespective of which of the blurring processes 1A to 1C is performed by the first generation section 14A, the usability of the present invention is not impaired.

Blurring Process 1A: In a case where the operation mode corresponding to the blurring process 1A is set, the first generation section 14A performs the blurring process by performing the averaging filter process using, for example, the averaging filter 55 (FIG. 13) on the image in the area of the original distance image 31 corresponding to the non-gaze area, to thereby generate the pieces of the derived distance information 28. Even when, instead of the averaging filter process, for example, a smoothing filter process using any of various smoothing filter such as a median filter and a Gaussian filter, the usability of the present invention is not impaired.

Blurring Process 1B: In a case where the operation mode corresponding to the blurring process 1B is set, the first generation section 14A performs the blurring process and generates the pieces of the derived distance information 28, in the following manner. That is, the first generation section 14A identifies, with respect to each of the pixels in the area of the original distance image 31 corresponding to the non-gaze area, the mode of the pieces of distance information in an area containing the pixel and having a predetermined size, for example, a size of 3×3 pixels to a size of 50×50 pixels. This identification is performed based on, for example, a statistical distribution state of the pieces of distance information, such as a histogram. Then, the first generation section 14A set the pixel value of each pixel to be the identified mode.

Blurring Process 1C: In a case where the operation mode corresponding to the blurring process 1C is set, the first generation section 14A performs the blurring process and generates the pieces of the derived distance information 28, by changing each piece of distance information in the area of the original distance image 31 corresponding to the non-gaze area to the farther side of the origin position of the piece of distance information, that is, the farther side of the optical center 73a of the base camera 61.

Blurring Process 2: In a case where the operation mode corresponding to the blurring process 2 is set, the first generation section 14A performs the blurring process on the image in the area of the base image 21 corresponding to the non-gaze area, and thereby generates the derived image 24. In a case where the first vector acquisition section 18 has obtained a two-dimensional movement vector based on the base images 21 that were obtained as chronological images and another base image captured at a time different from the time when the base image 21 was captured, the first generation section 14A can performs the blurring process using the two-dimensional movement vector on said another base image, in accordance with the operation mode. To be specific, in a case where the non-gaze area of the base image 21 is identified based on the obtained two-dimensional movement vector, the first generation section 14A performs the blurring process on the image in the area corresponding to the non-gaze area of the base image 21, and as a result, generates the derived image 24. In each pixel in the area of the base image 21 corresponding to the non-gaze area, there is each pixel of said another base image associated therewith by the two-dimensional movement vector. Then, the first generation section 14A may perform the blurring process, which has been applied to each pixel in the non-gaze area of the base image 21, on each associated pixel of said another base image, to thereby generate a derived image corresponding to said another base image. As described above, performing the same blurring process on associated pixels of the chronological base images can reduce uncomfortableness given to the observer who observes chronological stereoscopic images (moving image) that are generated based on the chronological base images, and also can suppress flickering in the chronological direction. Thus, the fatigue of the eyes of the observer can be reduced.

The first generation section 14A may perform the following process. That is, with respect to an image in an area of the original distance image 31 corresponding to the gaze area that is an area except the non-gaze area identified by the area information 2a, the first generation section 14A obtains the average value of the pieces of distance information in this area in accordance with the operation mode, to thereby obtain distance information that represents this gaze area. Based on this distance information, the first generation section 14A sorts the area of the original distance image 31 corresponding to the non-gaze area into a farther area that is at the farther side of the origin position of each distance information, and in other words, at the farther side of the optical center 73a of the base camera 61, than the gaze area is, and a closer area that is at the closer side than the gaze area is. Then, the first generation section 14A performs blurring processes with different degrees of blurring, on the two areas thus obtained by the sorting. For the purpose of reducing uncomfortableness given to the observer observing the stereoscopic image 26, the degree of blurring the closer area is normally set lower than the degree of blurring the farther area.

It may be also possible that the first generation section 14A performs one of the following blurring processes 2A to 2C in which details of the blurring process 2 are specified, in accordance with the operation mode. Irrespective of which of the blurring processes 2A to 2C is performed by the first generation section 14A, the usability of the present invention is not impaired.

Blurring Process 2A: As a specific method of the blurring process 2, the first generation section 14A can adopt a blurring process 2A, in which the averaging filter process using, for example, the averaging filter 55 (FIG. 13) is performed on an image in the area of the base image 21 corresponding to the non-gaze area identified by the area information 2a in accordance with the operation mode.

Blurring Process 2B: Likewise, the first generation section 14A can adopt a blurring process 2B, in which spatial discrete pixels in the area of the base image 21 corresponding to the non-gaze area are identified in accordance with the operation mode, and, based on the pixel values of the identified pixels, the pixel values of pixels in the area of the base image 21 corresponding to the non-gaze area except the identified discrete pixels are obtained, so that the blurring process is performed. To be specific, the first generation section 14A performs the blurring process 2B, for example, as follows. That is, the first generation section 14A divides the base image 21 into a plurality of areas, discretely identifies a central pixel of each of the areas, and adopts the pixel value of the pixel identified in each of the areas as the pixel value of the pixel in the area other than the identified pixel.

Blurring Process 2C: As a specific method of the blurring process 2, the first generation section 14A can adopt a blurring process 2C, in which a spatial high-frequency component of the pixel value in an area of the base image 21 corresponding to the non-gaze area is removed by means of, for example, a frequency analysis, and thereby the blurring process is performed.

Even in a case where, instead of the method in which the first generation section 14A performs the blurring process on the base image 21, a method in which, with respect to a pseudo image generated by the second generation section 15A which will be described later based on the base image 21 and the original distance image 31 or based on the base image 21 and the derived distance image 32, the second generation section 15A blurs an image in an area of the generated pseudo image corresponding to the non-gaze area of the base image 21 is adopted; the usability of the present invention is not impaired.

After the derived image 24 (FIG. 2) and the pieces of the derived distance information 28 (derived distance image 32) are generated as a result of the blurring process performed by the first generation section 14A, the generated derived image 24 (FIG. 2) and pieces of the derived distance information 28 (derived distance image 32) are supplied to the second generation section 15A.

Operation Of Second Generation Section 15A:

The second generation section 15A shown in FIG. 2 generates, based on the derived image and the pieces of derived distance information, the pseudo image 25 of an object which corresponds to image-capturing from the virtual perspective that is different from the perspective from which the base image 21 has been captured (step S150 of FIG. 21). The generated pseudo image 25 is supplied to the third acquisition section 16, and used for obtaining the stereoscopic image 26. The second generation section 15A can perform a process for generating one pseudo image 25 as an image of a left-eye image and a right-eye image that forms the stereoscopic image 26, in accordance with the operation mode that is set. The second generation section 15A can also perform a process for generating two pseudo images 25 as a left-eye image and a right-eye image, in accordance with the operation mode. Even when the second generation section 15A adjusts the amount of parallax of the pseudo image 25 based on information concerning the display part 43, the usability of the present invention is not impaired.

Figure 18:
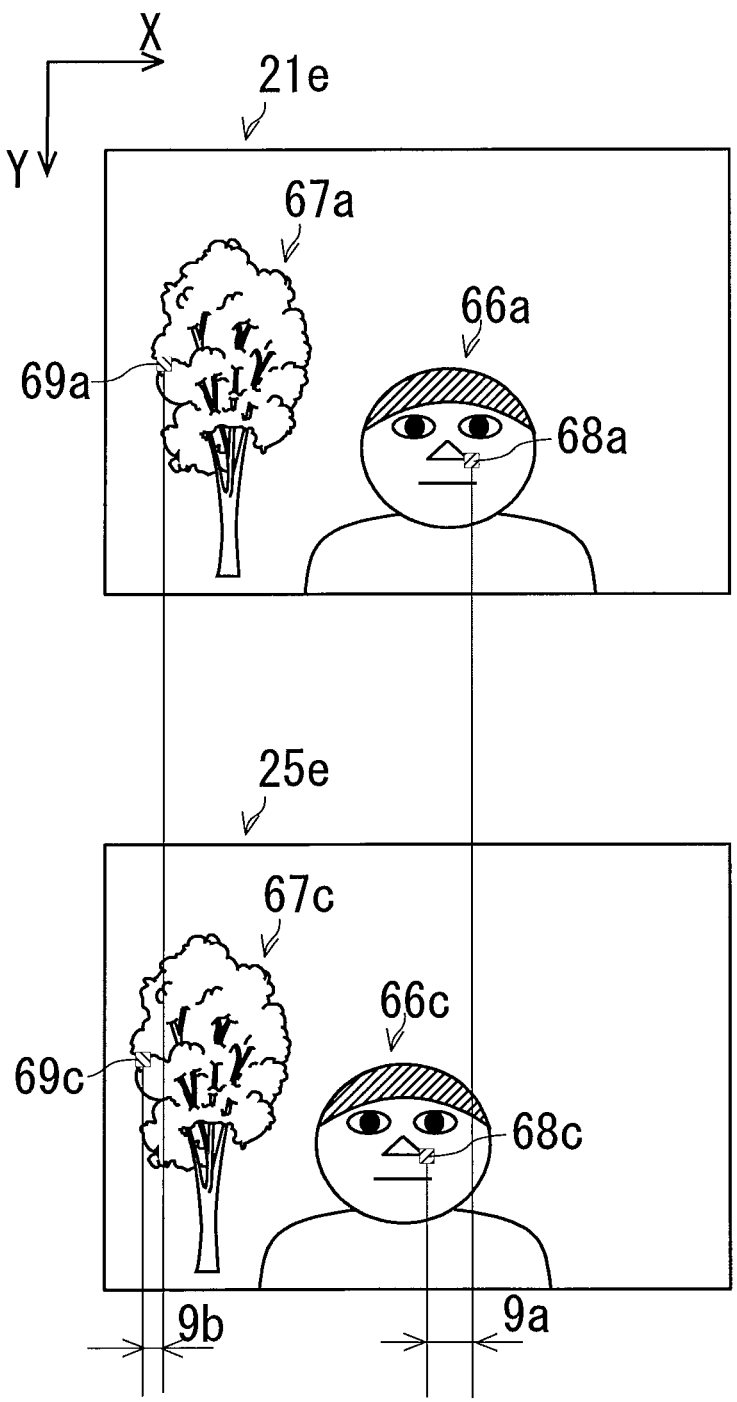
FIG. 18 is a diagram for explaining one example of a basic method for generating a pseudo image.

Next, a description will be given to a method in which the second generation section 15A generates a pseudo image based on pieces of distance information, such as each parallax corresponding to each pixel of the base image, each distance, and the like. FIG. 18 is a diagram for explaining one example of a basic method for generating a pseudo image 25e corresponding to image-capturing of an object from the virtual perspective that is different from the perspective from which the base image 21e has been captured, based on the base image 21e and each parallax between the base image 21e and the reference image 22e shown in FIG. 17.

The virtual perspective corresponding to the pseudo image 25e in FIG. 18 is located at a position that is apart from the perspective from which the base image 21e has been captured, by a base line length between the base camera 61 and the reference camera 62 toward the +X side along the X-axis direction. A foreground object image 66c and a background object image 67c in the pseudo image 25e correspond to a foreground object image 66a and a background object image 67a in the base image 21, respectively. A pixel 68a on the foreground object image 66a corresponds to a pixel 68c on the foreground object image 66c. A pixel 69a on the background object image 67a corresponds to a pixel 69c on the background object image 67c. In FIG. 18 as well as FIG. 17, for easiness of the description, only an edge (outline) of each distinguishing portion of each object image is displayed, while to facilitate understanding of the parallax, the base image 21e and the pseudo image 25 are displayed side by side in the vertical direction (Y-axis direction in FIG. 18) such that the X-coordinates of the left end (right end) of both of the images are coincident with each other.

In this case, the parallax 9a between the pixel 68a and the pixel 68b shown in FIG. 17 is set as a parallax between the pixel 68a in the base image 21e and the pixel 68c in the pseudo image 25e, and the parallax 9b between the pixel 69a and the pixel 69b shown in FIG. 17 is set as a parallax between the pixel 69a in the base image 21e and the pixel 69c in the pseudo image 25e. As for the other pixels of the pseudo image 25e, the parallax relative to the corresponding pixel in the base image 21e is set in the same manner. Thereby, the parallax between each pixel of the pseudo image 25e and the corresponding pixel in the base image 21e is obtained. Then, the base image 21e is transformed based on the obtained parallax, and thereby the pseudo image 25e is obtained.

Next, the above-described basic method for generating a pseudo image based on a base image and a parallax will be described in detail. FIG. 22 is a diagram illustrating an operational flow S10 of the above-described basic method, in which the pseudo image 25e is generated based on the base image 21e and the distance information about each pixel of the base image 21e.

Upon a process of the operational flow S10 of FIG. 22, a partial image 23a (FIG. 19) corresponding to one line of the base image 21e (FIG. 18) at the upper end (−Y direction end) thereof in the horizontal scanning direction (X-axis direction) is selected (step S20).

Figures 19, 20:
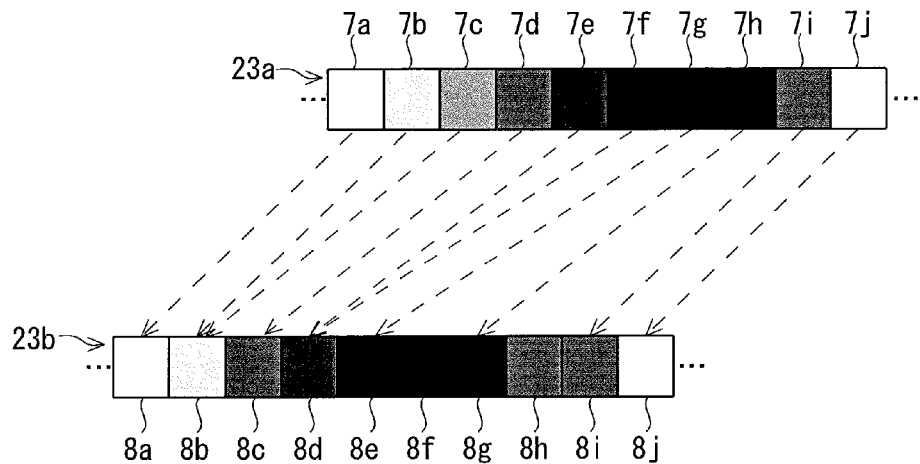
FIG. 19 is a diagram showing one example of the correspondence relationship of each pixel in a partial image of the base image relative to each pixel in a partial image of the pseudo image.
FIG. 20 is a diagram showing one example of the correspondence relationship of the coordinates of a pixel in the base image and distance information thereof relative to the coordinates of a pixel in the pseudo image.

FIG. 19 is a diagram showing one example of the correspondence relationship between pixels 7a to 7j of a part of the partial image 23a (FIG. 19) corresponding to one line of the base image 21e (FIG. 18) at the upper end (−Y direction end) thereof in the horizontal scanning direction (X-axis direction) and pixels 8a to 8j of a part of a partial image 23b (FIG. 19) corresponding to one line of the pseudo image 25e (FIG. 18), which corresponds to the base image 21e, at the upper end (−Y direction end) thereof in the horizontal scanning direction. The partial image 23a and the partial image 23b correspond to the same portion of the object. To facilitate understanding of the correspondence relationship, the pixels 7a to 7j and the pixels 8a to 8j are displayed in a state of being sorted according to the degree of shading that varies depending on a pixel value.

FIG. 20 is a diagram showing one example of correspondence of the coordinates of each of the pixels 7a to 7j of the partial image 23a (FIG. 19) and the parallax (distance information) thereof relative to the coordinates of each of the pixels 8a to 8j of the partial image 23b (FIG. 19). In the first row and the fifth row of FIG. 20, pixel numbers that identify the pixels 7a to 7j of the partial image 23a and pixel numbers that identify the pixels 8a to 8j of the partial image 23b are shown. In the second row of FIG. 20, the X-coordinate of each of the pixels 7a to 7j is shown in association with each of the pixel numbers shown in first row. In the third row of FIG. 20, among the parallaxes (distance information) calculated with respect to the base image 21e and the reference image 22e (FIG. 17), a parallax corresponding to each of the pixels 7a to 7j is shown in association with each of the pixel numbers shown in the first row.

After the partial image 23a corresponding to one line is selected in step S20 of FIG. 22, the coordinates (X-coordinate) of a pixel of the pseudo image 25e corresponding to each of the pixels of the selected partial image 23a are obtained, and in other words, the coordinates (X-coordinate) of each of the pixels 8a to 8j of the partial image 23b in the horizontal scanning direction (X-axis direction) are obtained (step S30 of FIG. 22).

Here, the above-described basic method is a method in a case where the virtual perspective corresponding to the pseudo image 25e (FIG. 18) exists in a position that is apart from the perspective from which the base image 21e (FIGS. 17 and 18) has been captured by a base line length between the base camera 61 and the reference camera 62 toward the +X side along the X-axis direction. Accordingly, the coordinates (Y-coordinates) of the pixels of the partial image 23a and the partial image 23b with respect to the vertical direction (Y-axis direction) are identical with each other. The parallaxes shown in the third row of FIG. 20 are also parallaxes between the partial image 23a and the partial image 23b.

Accordingly, the X-coordinate of each pixel of the partial image 23b is calculated by the expression (4). In the fourth row of FIG. 20, the X-coordinate of each of the pixels 8a to 8j, which is calculated by the expression (4), is shown in association with each of the pixel numbers shown in the fifth row.

[Math. 4]

$$Xb = Xa - d \quad (4)$$

where:
Xa: X-coordinate of the pixel of the partial image belonging to the base image
Xb: X-coordinate of the pixel of the partial image belonging to the pseudo image
d: parallax After the horizontal pixel coordinates of the pixels of the partial image 23b corresponding to one line of the pseudo image 25e are obtained, then the pixel value of each pixel of the partial image 23b is obtained. That is, an image of the partial image 23b corresponding to one line is generated (step S40 in FIG. 22). Next, processing in step S40 will be described by taking, as an example, the pixels 7a to 7j of the partial image 23a and the pixels 8a to 8j of the partial image 23b shown in FIG. 19.

Referring to the X-coordinates of the pixels 8a to 8j shown in the fourth row of FIG. 20, the pixels 7a, 7b, 7c, 7d, 7e, 7f, 7g, 7h, 7i, and 7j of the partial image 23a correspond to the pixels 8a, 8b, 8b, 8c, 8d, 8d, 8e, 8g, 8i, and 8j of the partial image 23b, respectively. To be specific, in the pixels 8a to 8j, there are three types of pixels, namely, a first type pixel that is associated with one pixel among the pixels 7a to 7j, a second type pixel associated with two pixels among the pixels 7a to 7j, and a third type pixel associated with one of the pixels 7a to 7j.

In the processing in step S40 of FIG. 22, as the pixel value of a first type pixel, the pixel value of the pixel of the partial image 23a corresponding to the first type pixel is adopted. As the pixel value of a second type pixel, the representative value, such as the average value, of the pixel values of the two pixels of the partial image 23a corresponding to the second type pixel is adopted. As the pixel value of a third type pixel, for example, the pixel value of, among the pixels of the partial image 23b whose pixel values have been obtained based on the correspondence relationship with the partial image 23a, the pixel that is spatially closest to the third type pixel, is adopted. An image of the partial image 23b is identified by the coordinates (X-coordinate) and the pixel value of the pixel that has been identified with respect to each pixel of the partial image 23b.

After the processing of step S40 is completed, whether or not the process (steps S30 to S40) for generating a partial image of a corresponding pseudo image is completed with respect to all the lines of the base image 21e in the horizontal direction (X-axis direction), is checked (step S50 of FIG. 22). In a case where it is revealed as a result of the checking in step S50 that the process is not completed with respect to all the lines in the horizontal direction, the line of the base image 21 next to the processed line with respect to the +Y direction is selected as a new processing object (step S60 of FIG. 22), and the processing returns to step S30. In a case where it is revealed as a result of the checking in step S50 that the process for generating a partial image of a pseudo image is completed with respect to all the lines in the horizontal direction, the process for generating the pseudo image 25e is completed.

The transformation of the base image 21e based on the parallaxes may be performed on a pixel-size basis as a minimum unit. Therefore, if the parallaxes is obtained on a pixel-size basis, it is possible to obtain the pseudo image 25e. However, for example, even in a case where a corresponding point retrieval for obtaining the parallax is performed on a sub-pixel basis that is equal to or less than the pixel-size basis so that the parallax is obtained on a sub-pixel basis, the usability of the present invention is not impaired, because the pseudo image 25e can be obtained if the amount of transformation in transforming the base image 21e based on the parallax is on a pixel basis.

Next, a description will be given to a method for obtaining a pseudo image in a case where a base line length between the virtual perspective and the perspective from which the base image 21e has been captured is different from the base line length between the base camera 61 and the reference camera 62 corresponding to the base image 21e and the reference image 22e shown in FIG. 17, respectively. In this case, for example, firstly, the distance of each point on the object which corresponds to each point of the base image 21e is calculated from the parallax of the point of the base image, by using the expression (1). Then, based on the calculated distance and the base line length between the virtual perspective and the perspective from which the base image 21e has been captured, a parallax between each pixel of the base image 21e and each pixel of the pseudo image 25 is obtained by using the expression (1). Then, based on the obtained parallax, the image of the base image 21e is transformed, to thereby obtain the pseudo image 25 corresponding to this different base line length. Accordingly, as will be described later in the Section of modifications, various types of three-dimensional measurement machines are adoptable instead of the stereo camera 300.

The second generation section 15A transforms the base image 21 by applying, for example, the above-described basic method for generating the pseudo image 25 to the derived image 24 and the pieces of the derived distance information 28 (derived distance image 32) corresponding to the base image 21 and the pieces of the base distance information 27, respectively. Thereby, the second generation section 15A generates the pseudo image 25 of the object which corresponds to image-capturing from the virtual perspective that is different from the perspective from which the base image 21 has been captured. The generated pseudo image 25 is supplied to the third acquisition section 16.

Operation of Third Acquisition Section 16:

The third acquisition section 16 shown in FIG. 2 obtains, as a stereoscopic image, the base image 21 and the pseudo image 25 supplied from the first acquisition section 12 and the second generation section 15A, respectively, and then causes the obtained stereoscopic image to be displayed on the display part 43. It may be also possible that the third acquisition section 16 obtains, as a stereoscopic image, a left-eye pseudo image and a right-eye pseudo image that are generated based on the base image 21 by the second generation section 15A. It may be also possible that the third acquisition section 16 generates a stereoscopic image by transforming the pseudo image 25 in accordance with, for example, a base line length between the eyes of the observer and the stereo camera 300 stored in the storage device 46, a difference in the focal point distance, and size information of the display part 43.

As described above, in the image processing apparatus 200A, the observer observing the stereoscopic image 26 generated by the image processing apparatus 200A can recognize the stereoscopic image of the object in which the original image quality and sense of distance are maintained in the gaze area. Additionally, since the amount of visual information concerning the stereoscopic view in the non-gaze area is reduced, the fatigue of the eyes caused by overabundance and mixing of the visual information concerning the stereoscopic view of the non-gaze area can be reduced.

<Modifications:>

While an embodiment of the present invention has been described above, the present invention is not limited to the above-described embodiment, and various modifications can be made thereto.

For example, although the stereo camera 300 of the image processing system 100A described above is configured such that the base line length between the base camera 61 and the reference camera 62 extends in the vertical direction, the direction of the base line length may be the horizontal direction or any other directions. The image-capturing magnifications of the base camera 61 and the reference camera 62 may be different from each other.

Even in a case where, for example, a three-dimensional measurement machine having an active metering system is adopted instead of the stereo camera 300, the usability of the present invention is not impaired. The reason therefor is as follows. The three-dimensional measurement machine includes the base camera 61 and a projector that projects, to an object, various types of detection light for the shape measuring, such as laser light. Based on the triangulation principle, the TOF (Time of Flight) method, or the like, the three-dimensional measurement machine obtains the base image 21 of the object and distance information about each point on the object corresponding to each pixel of the base image 21.

Based on the distance information and the expression (1), the three-dimensional measurement machine is able to obtain parallaxes of the pseudo image 25 relative to the base image 21, and obtain the pseudo image 25 based on the obtained parallaxes and the base image 21.

Normally, in an image in which an object is captured, the intensity of the image increases as the object is located closer, while the intensity of the image decreases as the object is located farther. Therefore, even in a case where a three-dimensional measurement machine that obtains the base image 21 by using the base camera 61 and that estimates and obtains distance information corresponding to each pixel of the base image 21 based on the intensity of the base image 21 is adopted instead of the stereo camera 300, the usability of the present invention is not impaired. Moreover, the usability of the present invention is not impaired even in a case where a method is adopted in which distance information corresponding to each pixel of the base image 21 is estimated and obtained based on the assumption that, in each pixel of the base image 21 (FIG. 5), as the Y-coordinate of the pixel increases, the point on the object corresponding to this pixel is located farther from the base camera 61.

Furthermore, even in a case where the base camera 61 and a three-dimensional measurement machine, which measures distance information about the distance of the object based on an image captured from a perspective different from the perspective from which the base image 21 has been captured, are adopted instead of the stereo camera 300, the usability of the present invention is not impaired, because, through matching the image captured from the different perspective against the base image 21, the correspondence between the base image 21 and the measured distance information can be made.

DESCRIPTION OF THE REFERENCE NUMERALS 100A image processing system
200A image processing apparatus
300 stereo camera
2a area information
3a, 3b non-gaze area
9a, 9b, d parallax
21 base image
22 reference image
23a, 23b partial image
24 derived image
25 pseudo image
26 stereoscopic image
27 piece of base distance information
28 piece of derived distance information
31 original distance image
32 derived distance image
55 averaging filter
61 base camera
62 reference camera
66a, 66b foreground object image
67a, 67b background object image
91 two-dimensional movement vector
92 three-dimensional movement vector
104 vanishing point
b base line length

The invention claimed is:

1. An image processing apparatus comprising:
a first acquisition section that obtains a base image in which an object is captured;
a second acquisition section that obtains pieces of base distance information each expressing distance information of a distance from a predetermined origin position to each of points on said object that correspond to respective pixels of said base image;

an identification section that performs an identification process for, based on a predetermined criterion, classifying an image space corresponding to each of said base image and a criterion distance image into a gaze area that is an area determined to include a main object of said object and a non-gaze area that is an area except the gaze area, and thus identifying said areas, said criterion distance image being defined by an arrangement of said pieces of base distance information corresponding to a pixel arrangement of said base image;

a first generation section that performs a generation process for generating a derived image and pieces of derived distance information that correspond to said base image and said pieces of base distance information, respectively, said derived image and said pieces of derived distance information being obtained as a result of a blurring process being performed on an image in an area of at least one of said base image and said criterion distance image, said area corresponding to said non-gaze area; and a second generation section that generates a pseudo image of said object based on said derived image and said pieces of derived distance information, said pseudo image corresponding to image-capturing from a virtual perspective that is different from a perspective from which said base image has been captured.

2. The image processing apparatus according to claim 1, wherein
said identification section performs said identification process based on at least one of a state of a statistical distribution and a state of a spatial distribution of coloration in said base image.

3. The image processing apparatus according to claim 1, wherein
said identification section performs said identification process by identifying, as said non-gaze area, a portion to be blurred in said base image.

4. The image processing apparatus according to claim 1, wherein
said identification section performs said identification process based on area information that specifies a range of a central portion of said base image.

5. The image processing apparatus according to claim 4, wherein
said identification section performs said identification process based on a vanishing point of said two-dimensional movement vector.

6. The image processing apparatus according to claim 1, wherein
said first acquisition section obtains another image of said object captured at a time different from a time when said base image has been captured,
said image processing apparatus further comprises a two-dimensional movement vector acquisition section that obtains a two-dimensional movement vector with respect to each pixel of said base image based on said base image and said another image,
said identification section performs said identification process based on said two-dimensional movement vectors.

7. The image processing apparatus according to claim 6, wherein said first generation section being configured to:
a) perform said generation process by performing a blurring process on an image in an area of said base image corresponding to said non-gaze area; and
b) generate another derived image corresponding to said another image, by performing a blurring process on pixels of said another image each of which is associated with each of pixels in said area by each of said two-dimensional movement vectors, said blurring process being the same as the blurring process applied to the pixels of said base image with which said pixels are associated.

8. The image processing apparatus according to claim 1, wherein
said identification section performs said identification process based on said pieces of base distance information.

9. The image processing apparatus according to claim 8, wherein
said identification section performs said identification process based on, among said pieces of base distance information, pieces of distance information within a predetermined distance range.

10. The image processing apparatus according to claim 8, wherein
said identification section performs said identification process based on, among said pieces of base distance information, pieces of distance information that are identified based on focusing distance information concerning said base image.

11. The image processing apparatus according to claim 8, wherein
said identification section performs said identification process by identifying an area of said criterion distance image as said gaze area, said area having a size equal to or larger than a predetermined size and being formed by connection of such pixels that a difference in the pieces of distance information is within a predetermined distance range.

12. The image processing apparatus according to claim 8, wherein
said identification section performs said identification process by identifying an area of said criterion distance image as said gaze area, said area having the largest size among areas each of which has a size equal to or larger than a predetermined size and is formed by connection of such pixels that a difference in the pieces of distance information is within a predetermined distance range.

13. The image processing apparatus according to claim 8, wherein
said identification section performs said identification process based on area information that specifies a range of a predetermined spatial area of said criterion distance image.

14. The image processing apparatus according to claim 1, wherein
said first acquisition section obtains another image of said object captured at a time different from a time when said base image has been captured,
said second acquisition section obtains other pieces of distance information with respect to points on said object each corresponding to each of pixels of said another image,
said image processing apparatus further comprises a three-dimensional movement vector acquisition section that obtains a three-dimensional movement vector with respect to each pixel of said base image based on said base image, said another image, said pieces of base distance information, and said other pieces of distance information,
said identification section performs said identification process based on said three-dimensional movement vectors.

15. The image processing apparatus according to claim 14, wherein
said identification section performs said identification process by extracting an area of said base image in which a moving object is captured based on said three-dimensional movement vectors, and identifying said area as said gaze area.

16. The image processing apparatus according to claim 14, wherein
said identification section performs said identification process by identifying, as said gaze area, an area of said base image in which said three-dimensional movement vector has a value equal to or greater than a predetermined threshold value.

17. The image processing apparatus according to claim 14, wherein
said identification section performs said identification process by identifying, among said three-dimensional movement vectors, the three-dimensional movement vector having an extension line thereof intersecting with an image-capturing system for capturing said base image, and identifying, as said gaze area, an area of said base image corresponding to said identified three-dimensional movement vector.

18. The image processing apparatus according to claim 1, wherein
said first generation section generates said pieces of derived distance information by performing a blurring process on an image in an area of said criterion distance image corresponding to said non-gaze area.

19. The image processing apparatus according to claim 18, wherein
said first generation section performs said blurring process by performing an averaging filter process on an image in an area of said criterion distance image corresponding to said non-gaze area.

20. The image processing apparatus according to claim 18, wherein
said first generation section performs said blurring process by, with respect to each pixel in an area of said criterion distance image corresponding to said non-gaze area, identifying, as a pixel value of said pixel, the mode of the pieces of distance information in an area containing said pixel and having a predetermined size.

21. The image processing apparatus according to claim 18, wherein
said first generation section performs said blurring process by changing each piece of distance information in an area of said criterion distance image corresponding to said non-gaze area to a farther side of said origin position.

22. The image processing apparatus according to claim 1, wherein
said first generation section generates said derived image by performing a bluffing process on an image in an area of said base image corresponding to said non-gaze area.

23. The image processing apparatus according to claim 22, wherein
said first generation section performs said blurring process by performing an averaging filter process on an image in an area of said base image corresponding to said non-gaze area.

24. The image processing apparatus according to claim 22, wherein
said first generation section performs said blurring process by obtaining, based on pixel values of pixels discretely identified in an area of said base image corresponding to said non-gaze area, pixel values of pixels of said area other than said discretely-identified pixels.

25. The image processing apparatus according to claim 22, wherein
said first generation section performs said blurring process by removing a spatial high-frequency component of a pixel value in an area of said base image corresponding to said non-gaze area.

26. The image processing apparatus according to claim 1, wherein
said first generation section performs blurring processes with different degrees of blurring on a farther area and a closer area, respectively, of an image in an area of at least one of said base image and said criterion distance image corresponding to said non-gaze area, said farther area being at the farther side of said origin position than said gaze area is, said closer area being at the closer side of said origin position than said gaze area is.

27. The image processing apparatus according to claim 1, further comprising a third acquisition section that obtains a stereoscopic image based on said pseudo image.

28. An image processing method comprising:
a first acquisition step of obtaining a base image in which an object is captured;
a second acquisition step of obtaining pieces of base distance information each expressing distance information of a distance from a predetermined origin position to each of points on said object that correspond to respective pixels of said base image;
an identification step of performing an identification process for, based on a predetermined criterion, classifying an image space corresponding to each of said base image and a criterion distance image into a gaze area that is an area determined to include a main object of said object and a non-gaze area that is an area except the gaze area, and thus identifying said areas, said criterion distance image being defined by an arrangement of said pieces of base distance information corresponding to a pixel arrangement of said base image;
a first generation step of performing a generation process for generating a derived image and pieces of derived distance information that correspond to said base image and said pieces of base distance information, respectively, said derived image and said pieces of derived distance information being obtained as a result of a blurring process being performed on an image in an area of at least one of said base image and said criterion distance image, said area corresponding to said non-gaze area; and
a second generation step of generating a pseudo image of said object based on said derived image and said pieces of derived distance information, said pseudo image corresponding to image-capturing from a virtual perspective that is different from a perspective from which said base image has been captured.

29. A non-transitory computer readable recording medium storing a computer-readable program, said program controlling a computer to operate as an image processing apparatus, and said image processing apparatus comprising:
a first acquisition section that obtains a base image in which an object is captured;

a second acquisition section that obtains pieces of base distance information each expressing distance information of a distance from a predetermined origin position to each of points on said object that correspond to respective pixels of said base image;

an identification section that performs an identification process for, based on a predetermined criterion, classifying an image space corresponding to each of said base image and a base distance image into a gaze area that is an area determined to include a main object of said object and a non-gaze area that is an area except the gaze area, and thus identifying said areas, said base distance image being defined by an arrangement of said pieces of base distance information corresponding to a pixel arrangement of said base image;

a first generation section that performs a generation process for generating a derived image and pieces of derived distance information that correspond to said base image and said pieces of base distance information, respectively, said derived image and said pieces of derived distance information being obtained as a result of a blurring process being performed on an image in an area of at least one of said base image and said base distance image, said area corresponding to said non-gaze area; and a second generation section that generates a pseudo image of said object based on said derived image and said pieces of derived distance information, said pseudo image corresponding to image-capturing from a virtual viewpoint that is different from a viewpoint from which said base image has been captured.

\* \* \* \* \*